(12) United States Patent
Smirnov et al.

(10) Patent No.: US 11,841,926 B2
(45) Date of Patent: Dec. 12, 2023

(54) IMAGE FUSION PROCESSOR CIRCUIT FOR DUAL-MODE IMAGE FUSION ARCHITECTURE

(71) Applicant: Apple Inc., Cupertino, CA (US)

(72) Inventors: Maxim Smirnov, Portland, OR (US); Kaiming Liu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 379 days.

(21) Appl. No.: 17/173,074

(22) Filed: Feb. 10, 2021

(65) Prior Publication Data

US 2022/0253651 A1 Aug. 11, 2022

(51) Int. Cl.
*G06T 3/00* (2006.01)
*G06T 3/40* (2006.01)
*G06V 10/75* (2022.01)
*G06F 18/25* (2023.01)

(52) U.S. Cl.
CPC .......... *G06F 18/251* (2023.01); *G06T 3/0093* (2013.01); *G06T 3/40* (2013.01); *G06V 10/751* (2022.01)

(58) Field of Classification Search
None
See application file for complete search history.

(56) References Cited

U.S. PATENT DOCUMENTS

| | | | | |
|---|---|---|---|---|
| 7,492,962 B2 * | 2/2009 | Zhang | ..................... | G06T 5/009 |
| | | | | 382/284 |
| 8,873,883 B2 * | 10/2014 | Zhang | .................. | G06T 3/4061 |
| | | | | 382/302 |
| 9,626,745 B2 * | 4/2017 | Baqai | ..................... | G06T 5/009 |
| 10,853,927 B2 | 12/2020 | Smirnox et al. | | |
| 10,853,928 B2 | 12/2020 | Smirnov et al. | | |
| 2019/0318463 A1 * | 10/2019 | Zhang | ..................... | G06T 7/90 |
| 2020/0314289 A1 | 10/2020 | Wu et al. | | |
| 2020/0334787 A1 | 10/2020 | Smirnov et al. | | |

FOREIGN PATENT DOCUMENTS

| | | | | |
|---|---|---|---|---|
| CN | 112396562 A | * | 2/2021 | |
| CN | 112580711 A | * | 3/2021 | |
| CN | 110047058 B | * | 4/2021 | ............... G06T 5/50 |
| WO | WO 2018/136373 A1 | | 7/2018 | |

* cited by examiner

*Primary Examiner* — Mohammed Rachedine
(74) *Attorney, Agent, or Firm* — Sterne, Kessler, Goldstein & Fox P.L.L.C.

(57) ABSTRACT

Embodiments relate to an image processing circuit able to perform image fusion on received images in a first mode for fusing demosaiced and downscaled image data, and a second mode for fusing raw image data. In the first mode, raw image data received from an image sensor is demosaiced and resampled prior to undergoing image fusion. On the other hand, in the second raw image mode, the image processing circuit performs image fusion on the raw image data, and demosaics and resamples the generated fused raw image. The image processing circuit comprises an image fusion circuit that processes images of received image pyramids differently, based on whether the first or second mode is being run. The image fusion circuit further comprises an additional alpha-blending circuit allowing for the image fusion circuit to perform a fusion and an alpha-blending in a single pass through image fusion circuit.

20 Claims, 17 Drawing Sheets

FIG. 14

IMAGE FUSION PROCESSOR CIRCUIT FOR DUAL-MODE IMAGE FUSION ARCHITECTURE

BACKGROUND

1. Field of the Disclosure

The present disclosure relates to a circuit for processing images and more specifically to fusion of different images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to an image processing circuit able to perform image fusion on received images in a first mode for fusing demosaiced and downscaled image data, and a second mode for fusing raw image data. In the first mode, raw image data received from an image sensor is demosaiced and resampled prior to undergoing image fusion. On the other hand, in the second raw image mode, the image processing circuit performs image fusion on the raw image data, and demosaics and resamples the generated fused raw image. The image processing circuit comprises an image fusion circuit that processes images of received image pyramids differently, based on whether the first or second mode is being run. The image fusion circuit further comprises an additional alpha-blending circuit allowing for the image fusion circuit to perform a fusion and an alpha-blending in a single pass through image fusion circuit.

In some embodiments, an image fusion processor is provided that comprises a first image fusion circuit for fusing unscaled layers of received image pyramids, and a second image fusion circuit for fusing downscaled layers of received image pyramids. The first image fusion circuit configured to blend high frequency components of an unscaled layer of each of a first raw image pyramid and a second raw image pyramid to generate a fused high frequency component for the unscaled layer, and to aggregate the fused high frequency component for the unscaled layer with a fused image for a first downscaled layer to generate a fused raw image corresponding to an unscaled layer of a fused raw image pyramid. The second image fusion circuit is coupled to the first image fusion circuit, and is configured to generate the fused image for the first downscaled layer by blending high frequency components of the first downscaled layer of each of the first and second raw image pyramids to generate a high frequency component of the fused image, and to aggregate the generated high frequency component with a fused image corresponding to a subsequent downscaled layer of the first and second raw image pyramids.

In some embodiments, the unscaled layer of the first raw image pyramid and the second raw image pyramid comprise Bayer image data, whereas the first downscaled layer of each of the first and second raw image pyramids comprises RGB image data. In some embodiments, the first downscaled layer of each of the first and second raw image pyramids is generated from the unscaled layer of each of the first and second raw image pyramids by applying a plurality of decimation kernels corresponding to different color channels to each pixel of the unscaled layer, and downscaling the unscaled layer along each dimension by a factor of 2.

In some embodiments, the first image fusion circuit is configured to blend high frequency components of the unscaled layer of each of the first raw image pyramid and the second raw image pyramid based on a set of blending parameters. The set of blending parameters for a pixel of the unscaled layer are based on a patch distance for the pixel, which is determined by determining, for each a plurality of different color channels of the raw image data, a respective patch distance between pixels of the respective patches of the high frequency components of the unscaled layer of each of the first and second raw image pyramids associated with the pixel, and aggregating the determined patch distances for each color channel to generate an aggregated patch distance.

In some embodiments, the second image fusion circuit is configured to receive image data corresponding to the first downscaled layer of the first and second raw image pyramids, wherein the image data is in an RGB color space, convert the received image data from the RGB color space to a YCC color space, and generate the fused image for the first downscaled layer in the YCC color space.

In some embodiments, the fused raw image corresponding to the unscaled layer of the fused raw image pyramid comprises raw image data, and the fused image for the first downscaled layer comprises YCC image data.

In some embodiments, the first image fusion circuit further comprises an alpha-blending circuit configured to perform fixed-parameter alpha-blending between the aggregation of the fused high frequency component for the unscaled layer and the fused image for the first downscaled layer with a fused raw image corresponding to an unscaled player of a third raw image pyramid to generate the fused raw image corresponding to the unscaled layer of the fused raw image pyramid. In some embodiments, the first image fusion circuit routes the aggregation of the fused high frequency component for the unscaled layer and the fused image for the first downscaled layer to the alpha-blending circuit, or bypasses the alpha-blending circuit, based on a received control parameter.

BRIEF DESCRIPTION OF THE DRAWINGS

FIG. 14 illustrates examples of decimation kernels that may be applied to generate downscaled scales of a raw image pyramid, in accordance with some embodiments.

Figure 1:
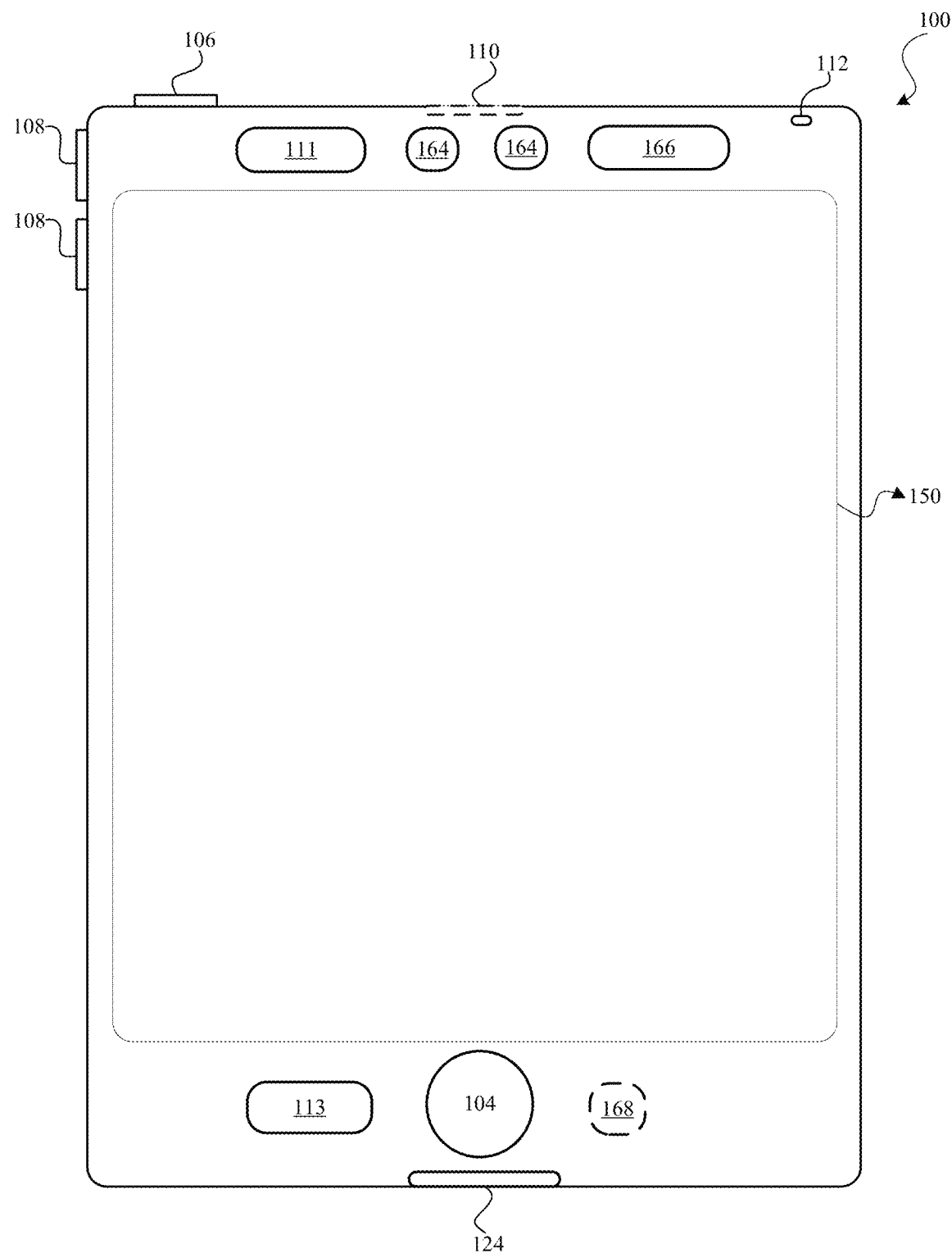
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image processing circuit able to perform image fusion (e.g., temporal and spatial fusion) on received images in at least two different modes, including a first mode for fusing demosaiced and downscaled image data, and a second mode for fusing raw image data. Raw image data is received from an image sensor in Bayer RGB format. In some applications, the raw image data is demosaiced, resampled, and then converted to YCC color space prior to undergoing image fusion. By performing these operations prior to image fusion, a memory footprint required by the image signal processor for image fusion may be reduced, as well as requiring less memory bandwidth and reduced power consumption. On the other hand, in other applications, image fusion is performed on the raw Bayer image data, whereupon demosaicing and resampling occurs after a fused raw Bayer image is generated. This may ensure a cleaner image signal for image fusion, but may consume more memory, memory bandwidth, and power. The image processing circuit is configured to support both modes of operation, allowing for fused images to be generated to satisfy the requirements of different applications.

The image processing circuit comprises an image fusion circuit configurable to fuse image pyramids generated from demosaiced and resampled image data, or image pyramids generated from raw image data, based on the operating mode of the image processing circuit. The image fusion circuit is configured to process images of received image pyramids differently, based on whether the image processing circuit is being run in processed image mode or raw image mode.

In addition, in some embodiments, the image fusion circuit comprises an additional alpha-blending circuit configured to alpha-blend fused images generated by blending first and second image pyramids with images of a third image pyramid, allowing for the image fusion circuit to perform a fusion of first and second image pyramids and an alpha-blending with a third image pyramid in a single pass through image fusion circuit. In some embodiments, the third image pyramid corresponds to a previous fusion of the first or second image pyramid (functioning as a reference image pyramid) with another image pyramid. The image fusion circuit may perform this additional alpha-blending for certain image processing applications, such as certain finite impulse response (FIR) applications. In other image processing applications, the additional alpha-blending circuit may be bypassed.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
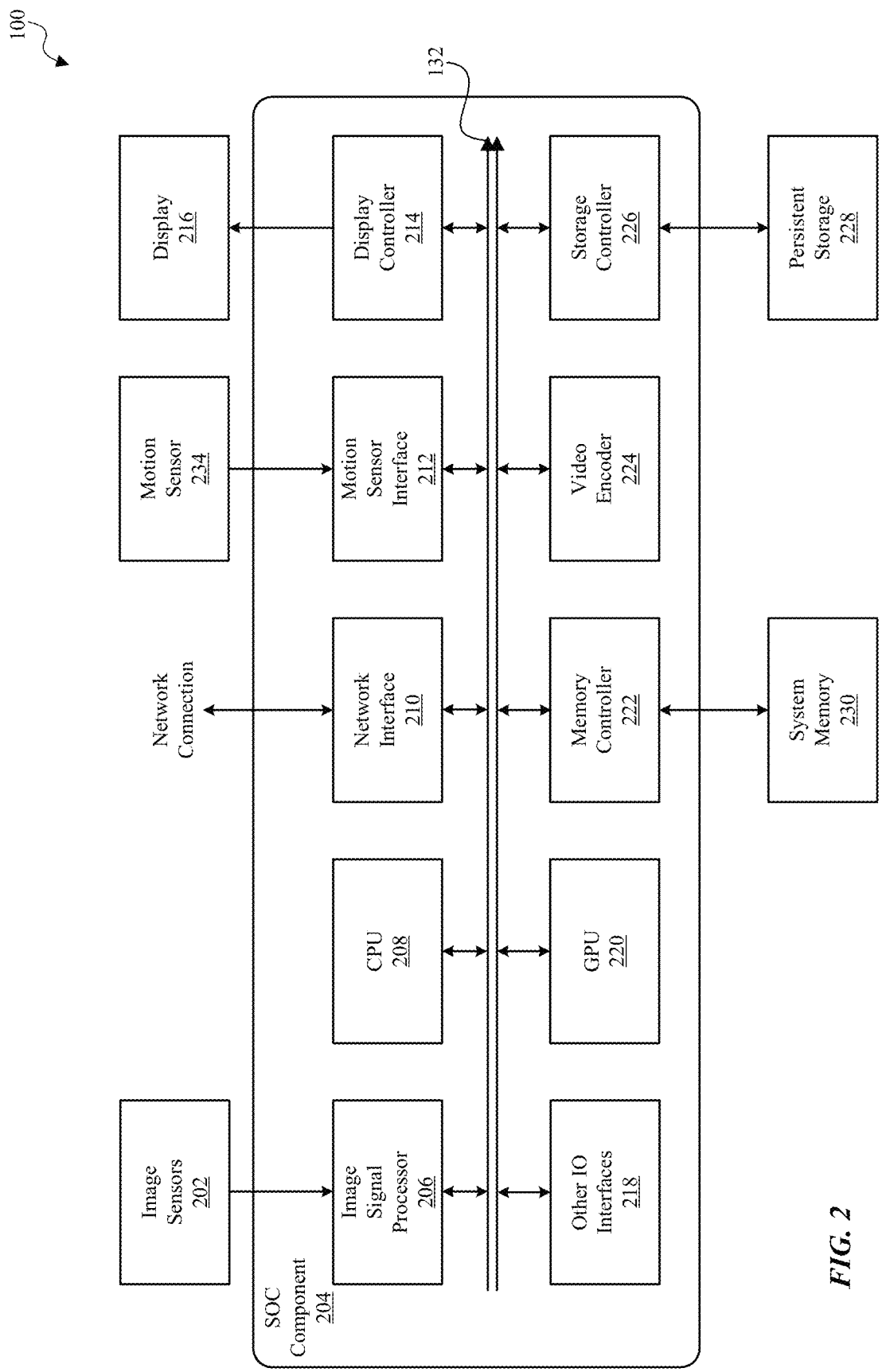
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
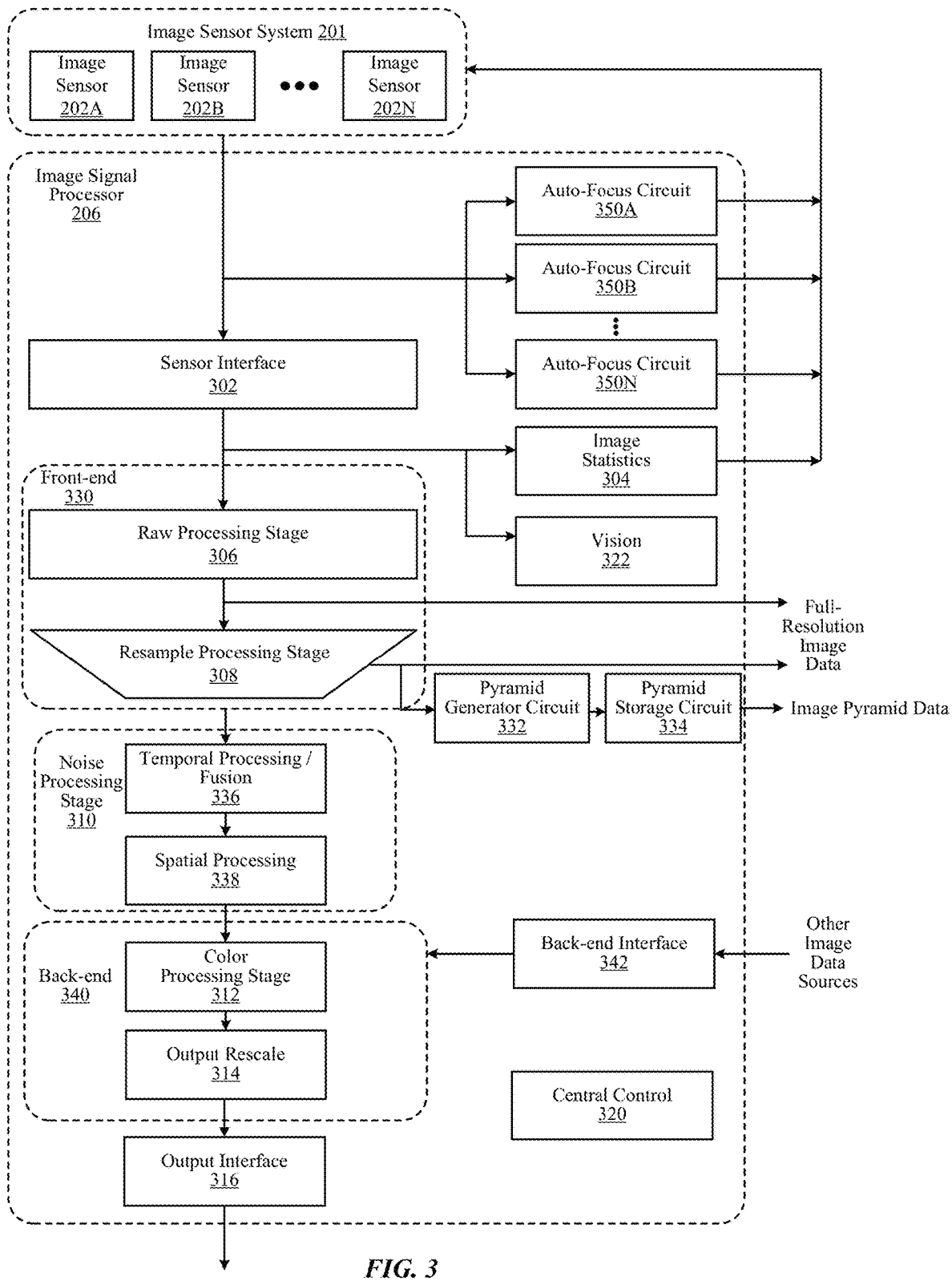
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, noise-processing stage 310, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more of the noise processing stage 310 and/or back-end pipeline stages 340 may process image data at a different rate less than the initial data rate. For example, in the embodiment of FIG. 3, back-end pipeline stages 340 (e.g., color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end stages 330, noise processing stage 310, and back-end stages 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor 202 without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Pyramid generator circuit 332 is a circuit configured to receive processed image output by the resample processing stage 308, and generate an image pyramid based upon the received image. Each generated pyramid comprises multiple downscaled images (also referred to as levels, scales, or octaves) each having a different resolution obtained by sequentially downscaling a received image. In some embodiments, each downscaled image of the pyramid includes the multiple color components (e.g., Y, Cr, Cb color components). In addition, the pyramid includes an unscaled single color version (e.g., Y luma component only) of the image. As such, the generated pyramid may include a plurality of stages 0 through n (e.g., 7 stages, corresponding to stages 0 through 6), where stage 0 corresponds to the unscaled single color image (e.g., Y component only), while stages 1 through n correspond to sequentially downscaled images with multiple color components (e.g., YCrCb), and the value of n (e.g., 6) corresponds to a number of downscaled levels. In some embodiments, each sequential stage of downscaling corresponds to downscaling each of the width and height by a factor of 2 relative to a previous stage. The generated pyramid thus comprises low frequency components of the downscaled versions of the received image and a low frequency component of an unscaled single color version (e.g., luma component) of the received image.

Pyramid storage circuit 334 is configured to receive an image pyramid (e.g., generated by the pyramid generator circuit 332) and store the image pyramid in a memory. In some embodiments, the pyramid storage circuit 334 stores a received image pyramid based upon how the image pyramid will be used for subsequent processing. For example, in some embodiments, a first image pyramid corresponding to a first image is fused with a second image pyramid corresponding to a second image, wherein the first or second image pyramid (corresponding to a "secondary" image) is warped based upon one or more warping parameters to align with the other image pyramid (corresponding to a "primary" image). In some embodiments, where the image pyramid is to be warped during an image fusion process, the pyramid storage circuit 334 converts the image pyramid into a tile format for storage. On the other hand, if the image pyramid does not need to be warped, the pyramid storage circuit 334 may cause the image pyramid to be stored in raster format. In some embodiments, the pyramid storage circuit 334 comprises a direct memory access (DMA) circuit, which may store the image pyramid (in raster or tile format) within persistent memory (e.g., a DRAM) or within a memory cache (e.g., an SRAM buffer that retains a portion of the image pyramid in the main system memory). In some embodiments, if only a portion of the image pyramid is to be stored (e.g., the image pyramid is to be immediately used for image fusion, such that only a portion of the pyramid needs to be stored at a time), then the DMA may store the image pyramid in memory cache, which acts as a buffer between the pyramid generator circuit 332 and the subsequent processing circuits (e.g., an image fusion circuit implemented as part of a noise processing stage 310). On the other hand, if the entire image pyramid is to be stored, and/or stored for a length of time, then the image pyramid may be stored in DRAM.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the preprocessed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. In some embodiments, the noise processing stage 310 comprises a temporal processing and fusion circuit 336 and a spatial processing circuit 338, configured to perform temporal filtering and spatial filtering, respectively, on received image data. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. For example, the noise processing stage 310 may perform image fusion by warping and fusing an image frame with a reference frame. In some embodiments, image fusion is performed using image pyramids of received image frames (e.g., generated by the pyramid generator circuit 332). In other embodiments, such as that illustrated in FIG. 4, spatial noise filtering may not be included as part of the temporal loop for temporal filtering (e.g., the spatial noise filter is applied to an image frame after it is stored as a reference image frame and thus the reference frame is not spatially filtered).

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
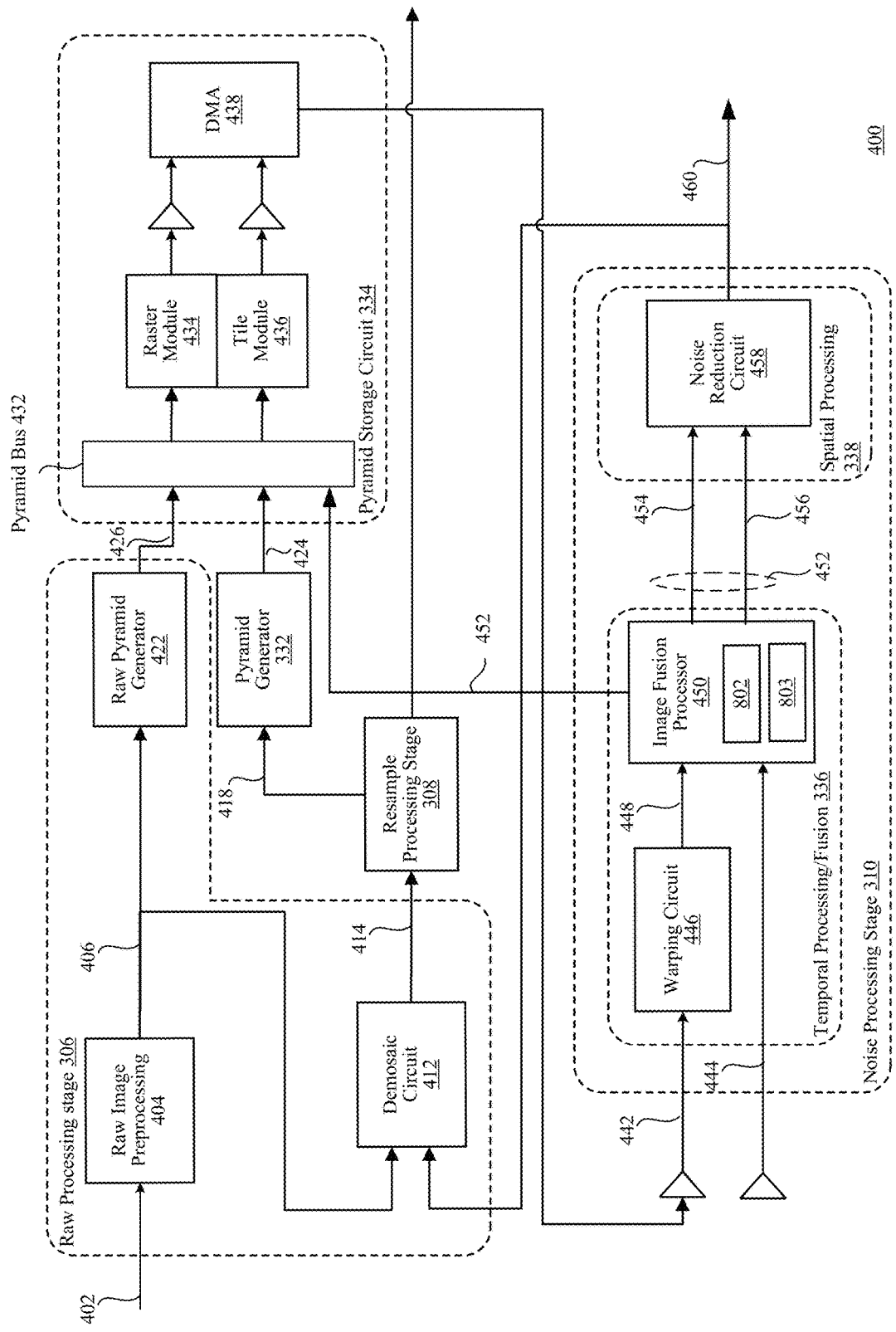
FIG. 4 is a block diagram illustrating a portion of the image processing pipeline including circuitry for image fusion, according to one embodiment.

FIG. 4 is a block diagram illustrating a portion of the image processing pipeline including circuitry for dual-mode image fusion, according to one embodiment. The image fusion circuit 400 may be implemented as part of the vision module 322, the front-end 330 (e.g., raw processing stage 306 and resample processing stage 308), pyramid generation circuit 332, pyramid storage circuit 334, and/or noise processing stage 310 illustrated in FIG. 3. For example, in some embodiments, the vision module 322 performs feature extraction from received images (e.g., based on keypoints of the received images) used for warping generated image pyramids, while pyramid generation is performed by the raw processing stage 306 (for generating raw image pyramids) and the pyramid generation circuit 332, and image fusion and noise reduction are performed at the back-end 340 (e.g., noise processing stage 310).

The image fusion circuit 400 is configurable to perform image fusion applications in at least two different modes, including a first processed image mode (e.g., YCC mode) in which raw image data is demosaiced and resampled prior to image pyramid generation and image fusion, and a second raw image mode in which image pyramid generation and image fusion is performed using received raw image data (e.g., Bayer image data). By performing image fusion using the raw image data, the fused image is generated with a greater amount of accuracy relative to the original image data. However, doing so may consume a larger memory footprint, which may not be practical for all applications. On the other hand, performing image fusion using the processed image mode may consume less memory when the demosaiced image is downscaled/resampled, but may result in fused images that are less accurate. As such, by being configurable to perform image fusion in either mode, the image fusion circuit 400 is able to generate fused images for a variety of different applications with different requirements for image signal accuracy and memory use. In addition, within each mode, the image fusion circuit 400 may implement a plurality of different types of fusion schemes, including bypass (e.g., no fusion), two-frame fusion (including but not limited to generation of HDR images), temporal filtering such as infinite impulse response (IIR) or finite impulse response (FIR), and/or the like. The image fusion functions by the image fusion circuit 400 on received images may be referred to as "temporal processing." The temporally processed images may then be received by a noise reduction circuit for performing "spatial processing" of the image. As such, the image fusion circuit 400 is used to perform "temporal-then-spatial" processing on received images.

Figure 5A:
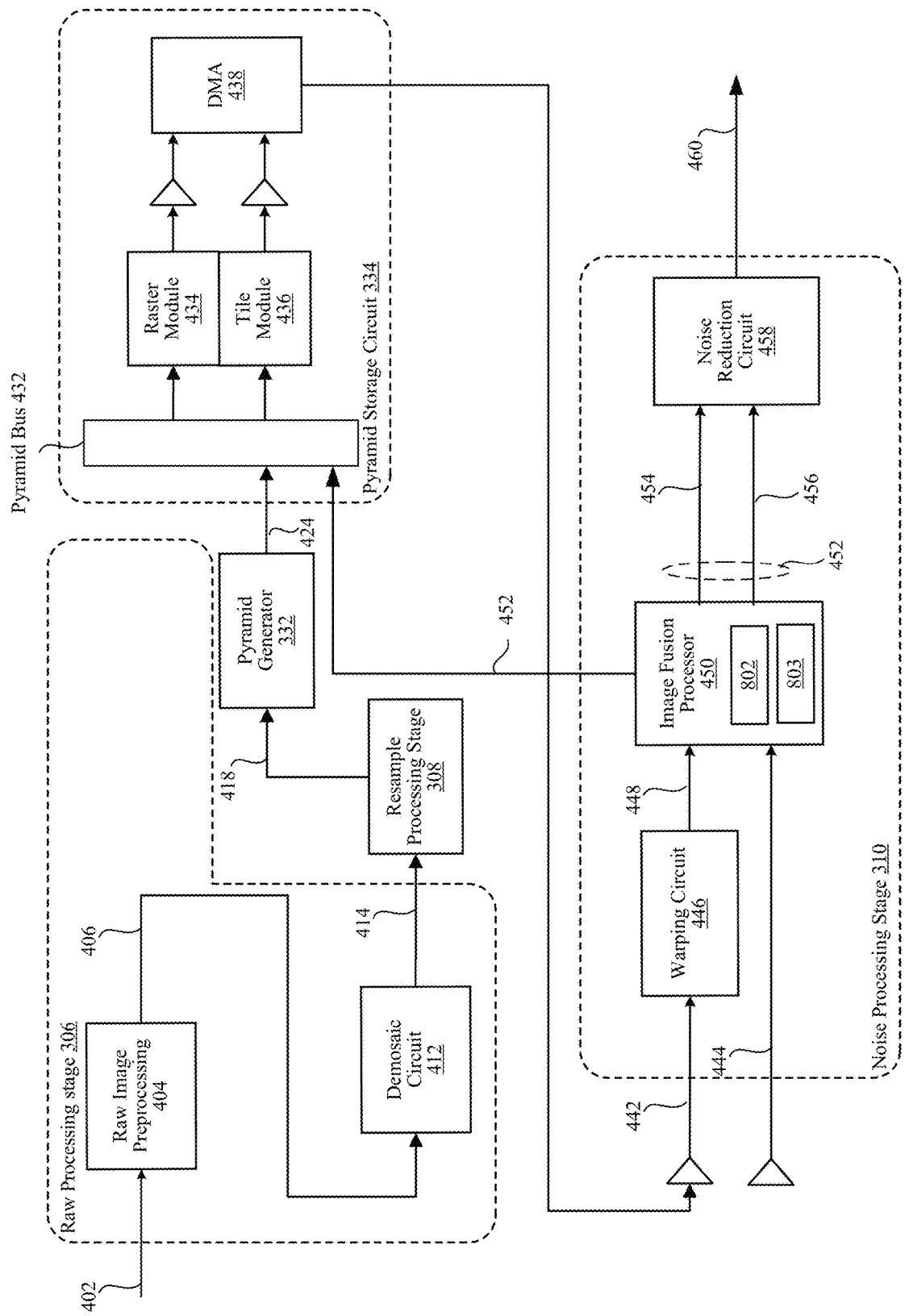
FIG. 5A illustrates a high level diagram of how the image fusion circuit operates in the first processed image mode, in accordance with some embodiments.
Figure 5B:
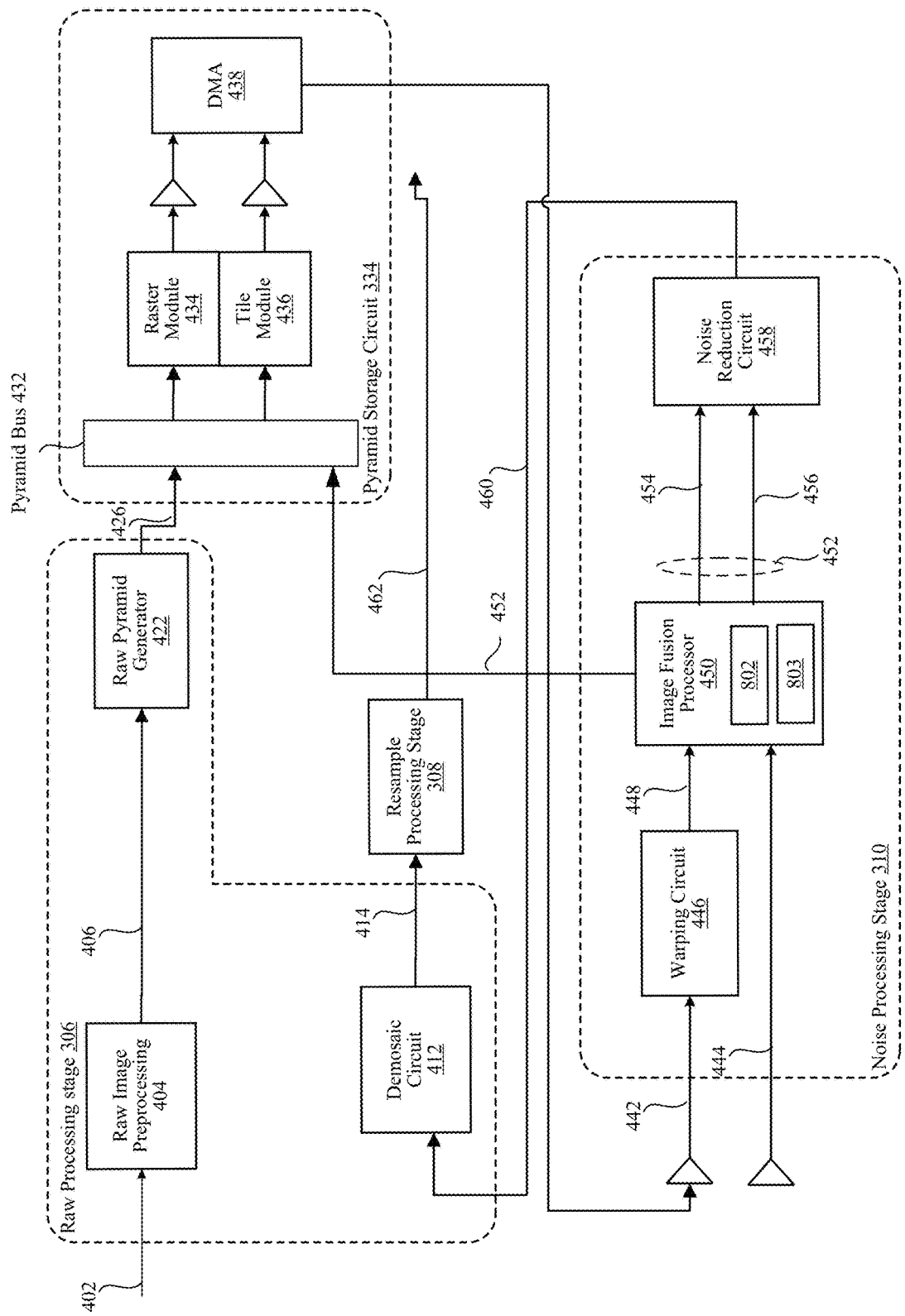
FIG. 5B illustrates a high level diagram of how the image fusion circuit operates in the second raw image mode, in accordance with some embodiments.

As shown in FIG. 4, the image fusion circuit 400 may include the raw processing stage 306, the resample processing state 308, and the noise processing stage 310. Each of these stages may be operated differently based on whether the image fusion circuit 400 is operating in the first processed image mode or second raw image mode. In some embodiments, a controller (e.g., central control 320 illustrated in FIG. 3, not shown in FIG. 4) is coupled to the image fusion circuit 400 and configures the components of the image fusion circuit 400 to perform different operations based on the desired mode or image fusion scheme. In some embodiments, the controller sets a control register based on whether the image fusion circuit 400 is to operate in the first processed image mode or the second raw image mode. The components of the image fusion circuit 400 (e.g., raw processing stage 306, resample processing stage 308, and noise processing stage 310) may access the control register to determine which mode to operate in, and, based on the value of the control register, perform different operations based on the selected mode. FIG. 5A illustrates a high level diagram of how the image fusion circuit 400 operates in the first processed image mode, in accordance with some embodiments, while FIG. 5B illustrates a high level diagram of how the image fusion circuit 400 operates in the second raw image mode, in accordance with some embodiments. Operations of the image fusion circuit 400 in each mode are described in relation to FIG. 4 and FIGS. 5A and 5B below.

The image fusion circuit 400 receives raw image data 402 captured by the image sensor system 201. In some embodiments, the raw image data 402 corresponds to a plurality of sequentially captured images, while in other embodiments, the raw image data 402 may correspond to sets of images captured concurrently using different image sensors 202 (e.g., first and second images captured at the same time using different sensors with different exposure times). The raw image data 402 may be received in a raw Bayer image format.

The raw image processing circuit 404 of the raw processing stage 306 receives the raw image data 402, and performs a series of Bayer preprocessing operations on the received raw image data. For example, as discussed above, operations performed by the raw image processing circuit 404 of the raw processing stage 306 may include, but are not limited to, raw noise filtering (RNF), lens shading correction (LSC), highlight recovery (HR), sensor linearization (SLIN), etc. In some embodiments, the raw image processing circuit 404 comprises a preprocessing pipeline in which the raw image data 402 undergoes a plurality of preprocessing operations in series. The raw image preprocessing circuit 404 outputs the image data generated from preprocessing the raw image data 402 as preprocessed raw image data 406. In some embodiments, different preprocessing operations may be performed based on whether the image fusion circuit 400 is running in processed image/YCC mode or raw image mode (e.g., in some embodiments, the preprocessing operations may include a raw noise filtering operation when the image fusion circuit 400 is in processed image mode to aid in demosaicing, while the raw noise filter may be bypassed when the image fusion circuit 400 is running in raw image mode).

The raw image processing circuit 404 of the raw processing stage 306 is coupled to a raw pyramid generator circuit 422 and demosaic circuit 412, and is configured to route the preprocessed raw image data 406 to either the raw pyramid generator circuit 422 or the demosaic circuit 412, based on whether the image fusion circuit 400 is operating in the first or second mode (e.g., using a MUX or other type of routing circuitry). For example, as illustrated in FIG. 5A, in the first processed image mode, the raw image preprocessing circuit 404 transmits the preprocessed raw image data to the demosaic circuit 412.

The demosaic circuit 412 is configured to receive raw image data (e.g., preprocessed raw image data 406), and demosaics the received raw image data to generate full-color image data 414 (e.g., RGB image data). For example, the demosaic circuit 412 may convert or interpolate missing color samples from received raw Bayer image data to output image data into a full-color domain. Demosaic operations may include low pass directional filtering on the interpolated samples to obtain full-color pixels. In some embodiments, the full-color image data 414 output by the demosaic circuit 412 is of the same resolution as the received Bayer image data.

The demosaic circuit 412 outputs the full-color image data 414 to the resample processing stage 308. As discussed above, the resample processing stage 308 may perform various operations to convert, resample, or scale image data received from raw processing stage 306. In some embodiments, the resample processing stage 308 converts the received image data 414 from an RGB format into YCbCr format for further processing. The resample processing stage 308 may further upscale or downscale the image data. For example, the resample processing stage 308 may downscale the image data by performing vertical resampling followed by horizontal resampling. In addition, the resample processing stage 308 may perform additional operations, such as removing color aliasing artifacts near luminance edges that may have been introduced by the demosaic circuit 412. In some embodiments, the resample processing stage 308 may also operate in a non-scaling mode, e.g., without downscaling the image data. In some embodiments, the resample processing stage 308 converts received image data to a YCC 4:4:4 color space when operating in non-scaling mode, and to a YCC 4:2:2 color space if performing upscaling or downscaling.

In the first processed image mode, the resampled image data 418 output by the resample processing stage 308 is received by the pyramid generator circuit 332, which generates an image pyramid 424 for each image frame of the image data. As discussed above, each generated pyramid comprises an unscaled single color version of the image (e.g., Y component only), and multiple full-color downscaled versions of the image obtained by sequentially downscaling the received image frame. The generated pyramid thus comprises low frequency components of the downscaled images and an unscaled single color version (e.g., luma component) of the received image.

The pyramid storage circuit 334 receives the image pyramids 424 output by the pyramid generator circuit 332, and stores the image pyramids in memory in preparation for warping and/or fusion. For example, in applications where two captured images are to be fused (e.g., concurrently captured long exposure image frame and short exposure image frame, or two sequentially captured images), the pyramid generator circuit 332 may generate a pyramid for the first of the two images, which is stored using the pyramid storage circuit 334 while an image pyramid for the second image is being generated.

The pyramid storage circuit 334 determines how the generated image pyramid 424 is to be stored, and may include, among other components, a pyramid bus 432, a raster module 434, tile module 436, and DMA 438. The pyramid bus 432 receives image pyramids (e.g., image pyramids 424 from the pyramid generator circuit 332, and/or raw image pyramids from the raw pyramid generator circuit 422, discussed in greater detail below) and sends the received pyramid to the raster module 434 or the tile module 436, based upon whether the image pyramid is to be warped as part of an image fusion process. For example, if a received image pyramid is to be warped as part of noise processing/image fusion, the pyramid bus 432 transmits the image pyramid to the tile module 436 to be converted into a tile format for storage. On the other hand, if the image pyramid does not need to be warped, the image pyramid is sent through the raster module 434. In some embodiments, the pyramid generator circuit 332 is configured to output the image pyramid 424 already in raster form. As such, the raster module 434 may simply be bypass circuit, allowing the image pyramid 424 to be stored to memory.

In some embodiments, the raster and/or tile modules 434 and 436 output the image pyramid to direct memory access (DMA) 438, which stores the image pyramid (in raster or tile format) within persistent memory (e.g., a DRAM) or within a cache that bypasses the memory. In some embodiments, if only a portion of the image pyramid is to be stored (e.g., the image pyramid is to be immediately used for image fusion, such that only a portion of the pyramid needs to be stored at a time), then the DMA 438 may store the image pyramid using the cache, which acts as a buffer between the pyramid generator circuit 332 and the noise processing stage 310. On the other hand, if the entire image pyramid is to be stored, and/or stored for a length of time, then the image pyramid is stored in the DRAM. In some embodiments, the DRAM is used to a store previously processed image pyramid (e.g., a history image pyramid) to be fused with image pyramids created from received image data 402.

The noise processing stage 310 performs temporal and spatial processing on image pyramids of received images (e.g., "temporal-then-spatial" processing). In some embodiments, the noise processing state 310 comprises an image fusion processor 450 and a noise reduction circuit 458. In some embodiments, the noise processing stage 310 is configured to receive, from the DMA 438, a first image pyramid 442 and a second image pyramid 444, and fuse the first and second image pyramids (e.g., at the image fusion processor 450) to generate a fused image pyramid 452. The fused image pyramid 452 is then processed by noise reduction circuit 458 to generate a denoised image 460. In some embodiments, the image fusion processor 450 and/or the noise reduction circuit 458 may be bypassed. For example, in some operating modes, the image fusion processor 450 may receive only the first image pyramid 442, and output the first image pyramid 442 as the fused image pyramid 452 to the noise reduction circuit 458.

In some embodiments, the first and second images pyramids 442 and 444 correspond to image pyramids 424 generated by the pyramid generator 332, using respectively, first and second images of the received images 402 that have been preprocessed, de-mosaiced, and resampled (e.g., resampled image data 418 generated from received images 402). In some embodiments, at least one of the first and second image pyramids 442 and 444 corresponds to a previously fused image pyramid (e.g., a previously fused image pyramid 452). How the first and second image pyramids 442 and 444 are received by the noise processing stage 310 may depend upon a current image fusion scheme (e.g., streaming, two-frame fusion, IIR, FIR, etc.) implemented by the image fusion circuit 400. In some embodiments, the noise processing stage 310 may be able to receive a generated pyramid 410 directly from the pyramid generator 332 (e.g., without going through the pyramid storage circuit 334).

In some embodiments, the noise processing stage 310 uses a warping circuit 446 to warp the first image pyramid 442 to be more spatially aligned with the second image pyramid 444 prior to fusing the first and second image pyramids, based upon one or more warping parameters. In some embodiments, the warping parameters correspond to parameters determined by an image registration processor (not shown) to align the images of the first image pyramid 442 with those of the second image pyramid 444 (which may be referred to as a primary or reference image pyramid). In some embodiments, the image registration processor is implemented as part of the vision module 322 illustrated in FIG. 3. The warping circuit 446 performs a linear or non-linear transformation defined by the model generated by the image registration processor to warp the first image pyramid 442 using the mapping information according to the warping parameters to generate a warped version of the first image pyramid 442 (e.g., warped image pyramid 448) spatially better aligned to the image of the second image pyramid 444 (e.g., a primary image or reference image). In some embodiments, the warping circuit 446 is a multi-scale warping circuit configured to warp each stage of the first image pyramid 442 to produce the warped image pyramid 448, comprising an unscaled warped single-color image and plurality of downscaled warped multi-color images.

The warped image pyramid 448 generated by warping circuit 446 is passed onto image fusion processor 450. Image fusion processor 450 performs per pixel blending between a portion of the images of the warped image pyramid 448 generated from the first image pyramid 442 with a portion of the images of the second image pyramid 444 to generate the fused image pyramid 452. The fused pyramid includes an unscaled single color image and one or more downscaled images having multiple color components, each downscaled image corresponding to a downscaled version of a previous stage of the fused image pyramid 452. In some embodiments, the fused image pyramid 452 (also referred to as a reconstructed pyramid) may be received by the pyramid storage circuit 334 to be stored in memory (e.g., a DRAM) for use in subsequent image fusion operations, based upon a current image fusion scheme implemented by the image fusion circuit 400. In addition, at least a portion of the fused image pyramid 452 is passed onto the noise reduction circuit 458 for further processing and enhancement (e.g., spatial processing). For example, in some embodiments, the unscaled single color version 454 and a first downscaled stage 456 (corresponding to a first downscaled level of the fused image pyramid 452, and has a pixel resolution equal to a quarter of a pixel resolution of unscaled single color version 454) of the fused image pyramid 452 are passed to the noise reduction circuit 458. The image fusion processing circuit 450 includes multi-scale image fusion circuit 802 to produce the downscaled images of the fused image pyramid 452 (including first downscaled version 456), shown in FIG. 8A, and image fusion circuit 803 to produce the unscaled single color version 454 of the fused image pyramid 452, shown in FIG. 8B.

Noise reduction circuit 458 is configured to receive at least a portion of the fused image pyramid (e.g., unscaled single-color version 454 and first downscaled version 456) and perform noise reduction (e.g., multi-band noise reduction (MBNR)) to obtain a denoised image 460. In some embodiments, the noise reduction circuit 458 is configured to, in processed image mode, generate a denoised unscaled single-color image (Y component only) and a denoised first downscaled version (having Cb and Cr components), allowing for construction of a full-resolution image with chroma sampled as 4:2:0. In some embodiments, the noise reduction circuit 458 further receives confidence values associated with each pixel of the unscaled single-color version 454 and first downscaled version 456, wherein an amount of noise reduction performed may be based upon the confidence values of the received images (e.g., a higher confidence value may indicate that less noise reduction is necessary). In some embodiments, each pixel is associated with a confidence value specified using a predetermined number of bits (e.g., 4 bits), where a confidence value of 0 indicates an invalid pixel, and may indicate a number of valid image pixels fused to produce the pixel. In some embodiments, the pyramid generator circuit 332 may mark overexposed pixels of received images as having a confidence value of 0, and propagate the confidence value to all stages of the generated pyramid.

Thus, as illustrated in FIG. 5A, the image fusion circuit, when operating in the first processed image mode, preprocesses and demosaics the received raw image data 402 (at the raw processing stage 306) to convert the raw image data 402 to color image data 414 (e.g., RGB image data), and resamples the image data at the resample processing stage 308 (which may further convert the image data to YCC image data) to generate resampled image data 418, which is used by the pyramid generator 332 to generate an image pyramid of the processed image data. The generated image pyramid 424 may then be processed at the noise processing stage 310 (e.g., following storage using the pyramid storage circuit 430), where it may undergo image fusion and/or noise reduction to generate a denoised image 460 as a final output image.

On the other hand, in the second raw image mode, the image fusion circuit 400, as illustrated in FIG. 5B, generates image pyramids using raw image data (e.g., raw Bayer image data) and performs noise processing operations on the generated pyramids, prior to de-mosaicing and resampling. Because image fusion and noise reduction processing are performed on the raw image data without resampling or downscaling the raw image data, the resulting fused images may be of high quality. However, as the raw image data is not downsampled prior to pyramid generation, the image pyramids and fused images will occupy a larger memory footprint, which may not be practical for certain applications.

As illustrated in FIG. 5B, when the image fusion circuit 400 is operating in the second raw image mode, the raw image preprocessing circuit 404 receives the raw image data 402 and performs preprocessing on the raw image data 402. However, instead of sending the preprocessed raw image data 406 to the demosaic circuit 412 and resample processing stage 308 for de-mosaicing and resampling, the preprocessed raw image data is received by a raw pyramid generator 422.

The raw pyramid generator 422 generates a raw image pyramid 426 from an image of the preprocessed raw image data 406. The raw image pyramid 426 generated by the raw pyramid generator 422 comprises a first unscaled image (scale 0 or stage 0) of raw image data (e.g., Bayer image data), and multiple full-color (e.g., RGB) downscaled versions of the image obtained by sequentially downscaling the received image frame (scales/stages 1 through n). The generated raw image pyramid 426 is stored using the pyramid storage circuit 334. For example, similar to the image pyramid 424 discussed above in relation to the first operating mode, the raw image pyramid 426 is received by the pyramid bus 432, which sends the raw image pyramid 426 to the raster module 434 or the tile module 436, based upon whether the image pyramid 426 is to be warped as part of an image fusion process, the results of which are transmitted by the DMA 438 to be stored in persistent storage or cached.

Figure 13:
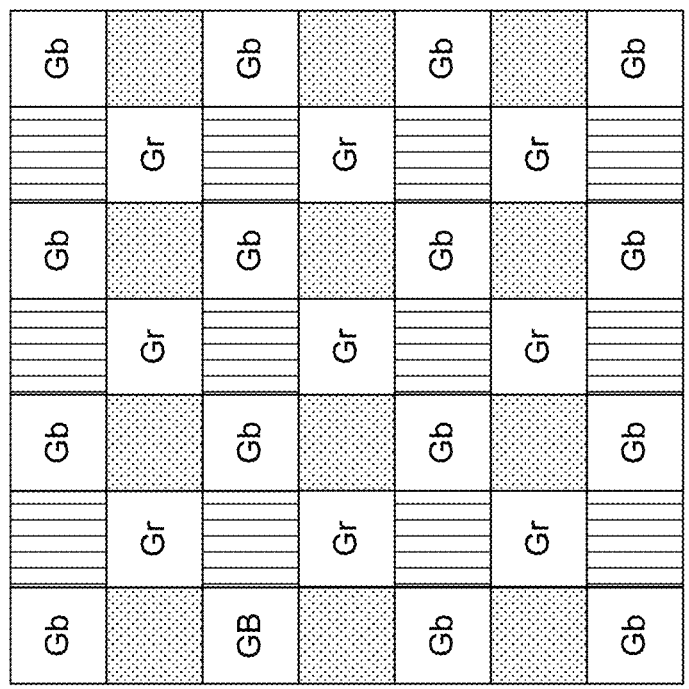
FIG. 13 illustrates an example of raw Bayer image data, in accordance with some embodiments.
Figure 14:
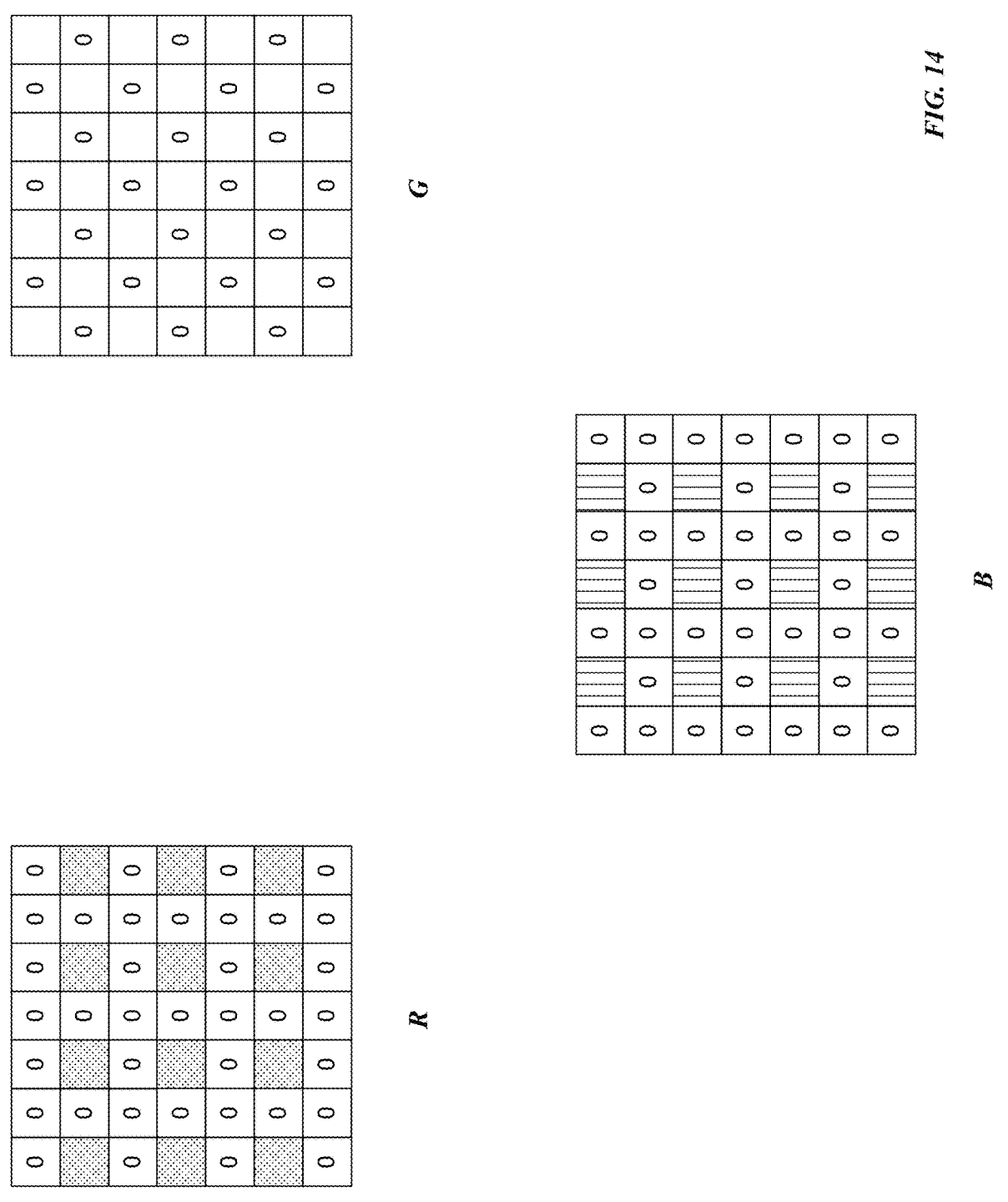

In some embodiments, scale 0 of the raw image pyramid 426 includes the raw image data following preprocessing by the raw image preprocessing circuit 404 (e.g., Bayer-sampled R, G, and B pixels output by the raw image preprocessing circuit 404 based on the received raw Bayer image data). In addition, the raw pyramid generator 422 may generate scale 1 of the raw image pyramid 426 (corresponding to the first downscaled version of the image) by applying a programmable decimation kernel to each pixel of the raw image data. FIG. 13 illustrates an example of raw image data (e.g., Bayer image data), in accordance with some embodiments. In the raw image data, each pixel corresponds to a particular color component, red (R), blue (B), or green (Gr and Gb). FIG. 14 illustrates examples of decimation kernels that may be applied to generate downscaled scales of a raw image pyramid, in accordance with some embodiments. The decimation kernels include a red (R) decimation kernel, blue (B) decimation kernel, and green (G) decimation kernel, and are programmed such that, for a Gr pixel of the raw image data, a red value is calculated based upon red pixels of the raw image data within a specified neighborhood (e.g., 7 by 7 neighborhood) of the pixel, while a blue value is calculated based upon blue pixels of the neighborhood, and green values calculated based upon green pixels of the neighborhood. The resulting image is then downsampled (e.g., at the location of the Gr pixels in the raw image data) to generate a downscaled RGB image for scale 1 of the raw image pyramid that is downscaled relative to the unscaled image by a factor of 2 along each dimension. Subsequent downscaled scales of the raw image pyramid may be generated by further downscaling the scale 1 image.

Although FIGS. 4 and 5A-5B illustrate the raw pyramid generator 422 and the pyramid generator 332 as separate circuits, it is understood that in some embodiments, the raw pyramid generator 422 and the pyramid generator 332 may be implemented as part of the same circuit, which generates a processed image pyramid or a raw image pyramid from received image data based a current operating mode of the image fusion circuit 400, e.g., based upon a value of a control bit.

In the second raw image mode, the noise processing stage 310 receives stored raw image pyramids (e.g., from DMA 438) as the first and second image pyramids 442 and 448. Similar to the first processed image mode, the warping circuit 446 warps the first image pyramid 442 based upon one or more warping parameters to align the images of the first image pyramid 442 with those of the second image pyramid 444. The image fusion processor 450 performs per pixel blending between a portion of the images of the warped image pyramid 448 generated from the first image pyramid 442 with a portion of the images of the second image pyramid 444 to generate the fused image pyramid 452, where the multi-scale image fusion circuit 802 blends the downscaled images of the warped image pyramid 448 and second image pyramid to generate the downscaled images of the fused image pyramid 452 (including first downscaled version 456), while image fusion circuit 803 blends the unscaled raw images of the image pyramids to produce the unscaled raw image 454 of the fused image pyramid 452 (illustrated in greater detail in FIG. 9).

The fused pyramid includes an unscaled raw image and one or more downscaled images having multiple color components, each downscaled image corresponding to a downscaled version of a previous stage of the fused image pyramid 452. In some embodiments, the fused image pyramid 452 is received by the pyramid storage circuit 334 to be stored in memory (e.g., a DRAM) for use in subsequent image fusion operations, based upon a current image fusion scheme implemented by the image fusion circuit 400. In addition, at least a portion of the fused image pyramid 452 is passed onto the noise reduction circuit 458 for further processing and enhancement (e.g., the unscaled raw image 454 and a first downscaled stage 456 corresponding to a first downscaled level of the fused image pyramid 452 and having a pixel resolution equal to a quarter of a pixel resolution of unscaled single color version 454).

The image fusion processing circuit 450 comprises a control register configured to store a control parameter specifying an operating mode of the image fusion processing circuit 450 (e.g., indicating that the image fusion processing circuit 450 is operating in first processed image mode, or second raw image mode). In some embodiments, image fusion processing circuit 450 sets the control register based upon one or more configuration mode parameters received from a controller (e.g., central control 320). Based upon the control parameter, the image fusion processing circuit 450 processes the warped image pyramid 448 and the second image pyramid 444 differently, to implement the selected operating mode.

The noise reduction circuit 458 receives at least a portion of the fused image pyramid (e.g., unscaled raw image 452 and a first downscaled stage 454) and performs noise reduction on the received images to generate a denoised image 460 comprising raw image data. In some embodiments, the denoised image 460 corresponds to a denoised unscaled full resolution raw image (e.g., Bayer sampled full resolution image). Because the unscaled stage of the fuse image pyramid received by the noise reduction circuit 458 when operating in raw image mode comprises raw image data instead of single color data, the noise reduction circuit 458 will utilize different filter kernels for performing bilateral filtering on the raw image data in comparison to the single color image data when operating in the first processed image mode. For example, in some embodiments, the noise reduction circuit 458 utilizes different filter kernels corresponding to red, green, and blue pixels. In some embodiments, the noise reduction circuit 458 comprises a control register configured to store a control parameter specifying an operating mode of the noise reduction circuit 458 (e.g., indicating that the noise reduction circuit 458 is operating in first processed image mode, or second raw image mode). In some embodiments, noise reduction circuit 458 sets the control register based upon one or more configuration mode parameters received from a controller (e.g., central control 320), and processes the received image data in accordance with the set control register.

As illustrated in FIG. 5B, in raw image mode, the denoised image 460 generated by the noise reduction circuit 458 and comprising raw image data is transmitted to the demosaic circuit 412 and resample processing stage 308 to be demosaiced and resampled. For example, as discussed above, the demosaic circuit 412 may process the raw image data of the denoised image 460 to generate RGB image data, while the resample processing stage 308 may convert the RGB image data to YCC image data, and/or downsample the received image data. The resulting resampled image 462 may be output as an output image, to be used in subsequent applications.

As such, as illustrated in FIGS. 4 and 5A-5B, the image fusion circuit is able to operate in different modes to fuse processed image data or raw image data, based upon the requirements to specific applications. To do so, the image fusion circuit reconfigures how the image data is routed between different components, in order to demosaic and resample raw image data for generating a processed image pyramid usable for image fusion in the processed image mode, or to generate a raw image pyramid for image fusion, and only performing demosaicing and resampling afterwards, in raw image mode. In addition, certain components of the image fusion circuit, such as the image fusion processor 450 and the noise reduction circuit 458, may operate differently based on whether the image fusion circuit is operating in processed image mode or raw image mode (e.g., based on one or more received control parameters).

Example Process for Performing Image Fusion

Figure 6:
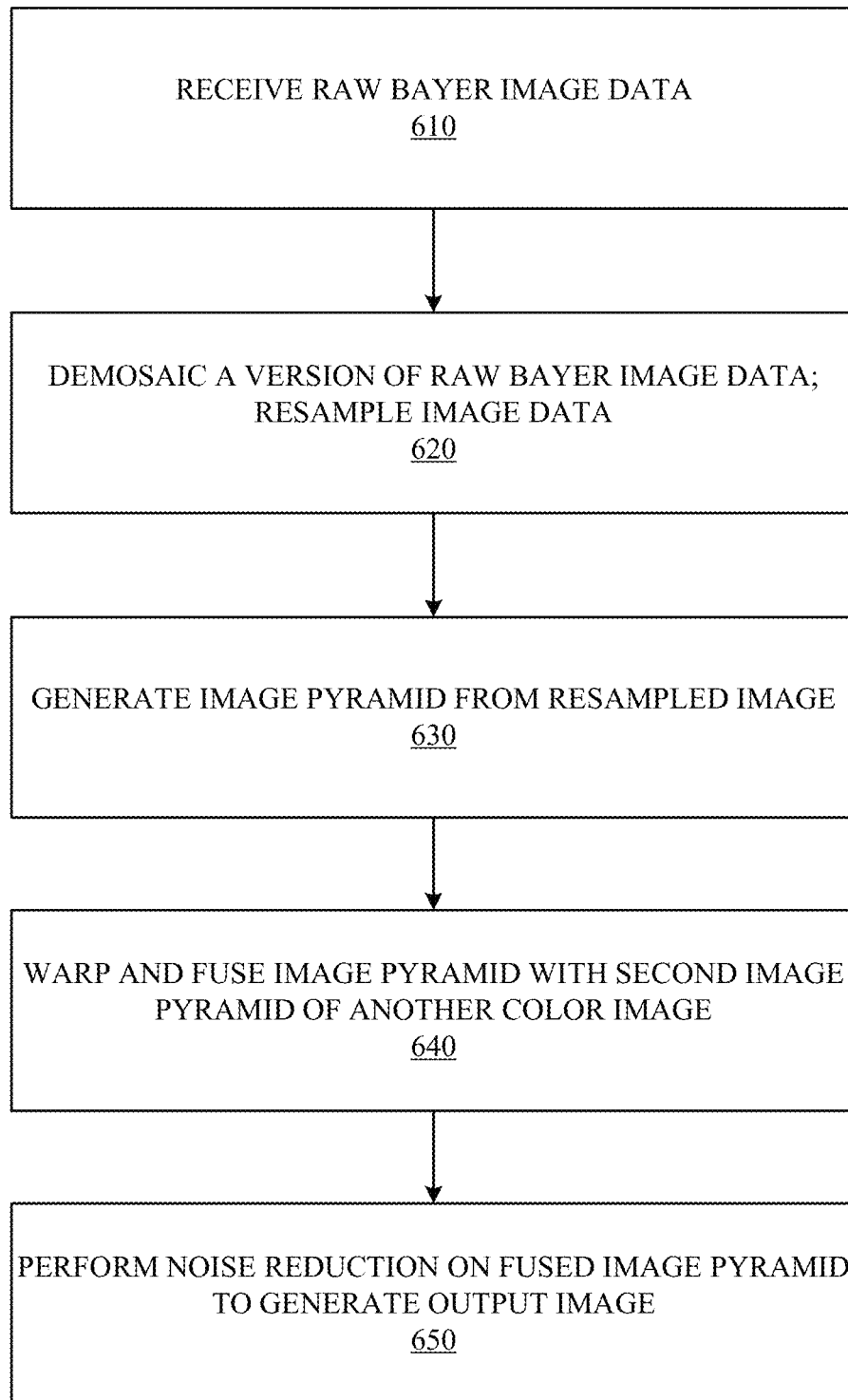
FIG. 6 illustrates a process for performing image fusion using a processed image mode.
Figure 7:
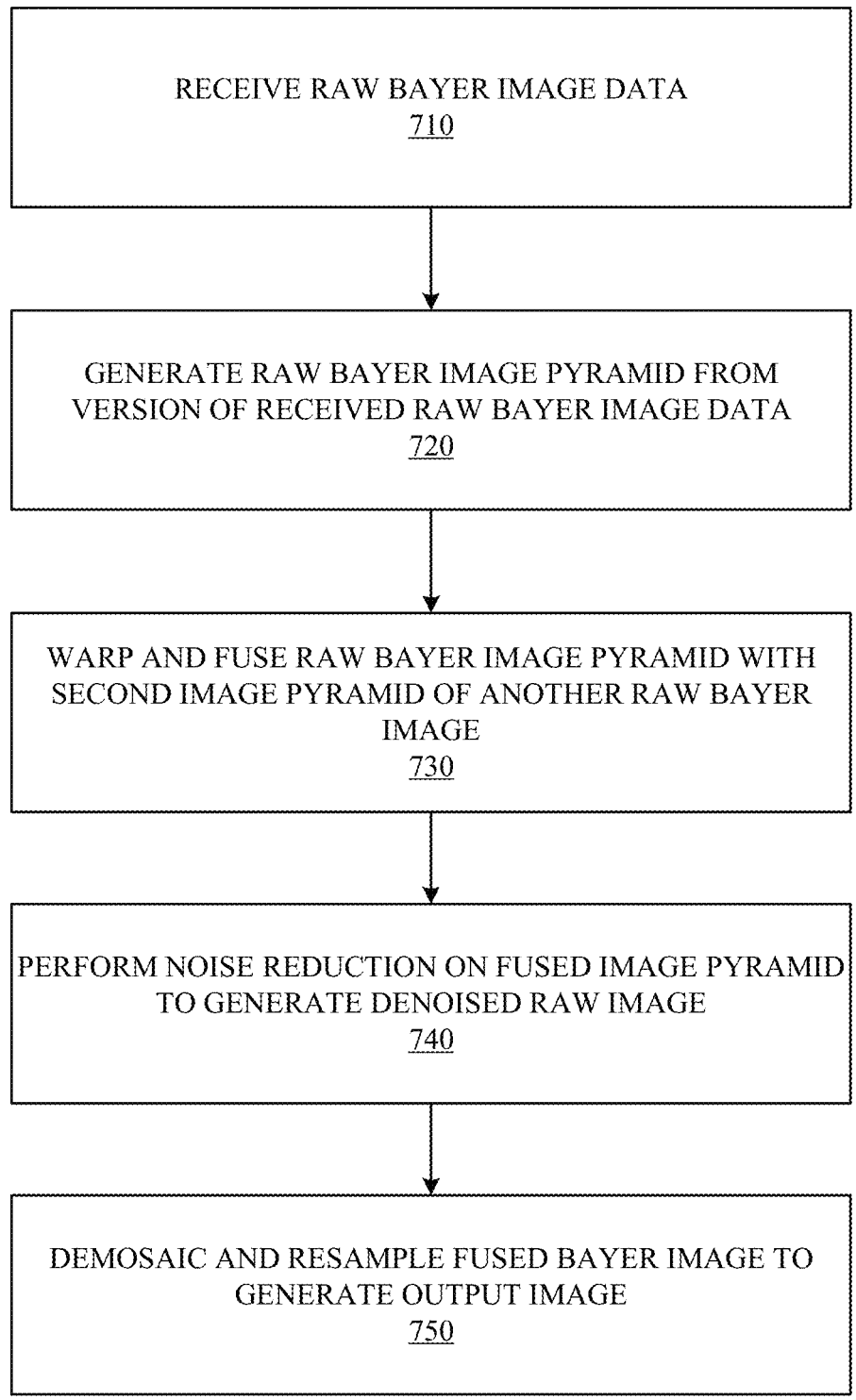
FIG. 7 illustrates a process for performing image fusion using a raw image mode, in accordance with some embodiments.

FIGS. 6 and 7 are flowcharts of processes for performing image fusion in a processed image mode and a raw image mode, in accordance with some embodiments. The methods illustrated in FIGS. 6 and 7 may be performed by an image fusion circuit (e.g., the image fusion circuit of FIG. 4) configurable to operate in either mode. For example, the image fusion circuit may receive a control parameter specifying which mode the image fusion circuit will operate in, and configures the components of the image fusion circuit and the routing between the components to operate in the specified mode. In some embodiments, the methods may include additional or fewer steps, and steps may be performed in different orders.

FIG. 6 illustrates a process for performing image fusion using a processed image mode. The image fusion circuit (e.g., image fusion circuit 400 of FIG. 4) receives 610 raw image data captured by one or more sensors corresponding to a first image. The raw image data may be received in a Bayer format. In some embodiments, the raw image data may undergo one or more preprocessing functions, such as raw noise filtering (RNF), lens shading correction (LSC), highlight recovery (HR), sensor linearization (SLIN), etc.

The image fusion circuit demosaics 620 the received raw image data to generate a first full color image, and may further resample the demosaiced image data to generate a first resampled image. In some embodiments, the image fusion circuit demosaics the raw image data to generate an image in the RGB color space. In some embodiments, the image fusion circuit, as part of the resampling, performs one or more color conversion operations on the demosaiced image data. For example, the image fusion circuit may convert the demosaiced RGB image data into YCC image data to generate the first resampled image. In addition, the image fusion circuit may downscale the image when resampling the image.

The image fusion circuit generates 630 an image pyramid from the first resampled image. The image pyramid comprises a plurality of levels, including a first level having a single-component unscaled version of the first resampled image (e.g., Y luminance component only) and one or more additional levels corresponding to full-color successively downscaled versions of the image. In some embodiments, each downscaled image is downscaled by a factor of two over each dimension relative to an image of a previous level of the pyramid, to have one quarter of the pixels as the previous level image. In some embodiments, the image fusion circuit stores the generated image pyramid in a memory or cache in preparation for image fusion.

The image fusion circuit fuses 640 the generated image pyramid with a second image pyramid to produce a fused image pyramid. In some embodiments, the second image pyramid corresponds to an image received at a different time, captured using a different exposure level, or some combination thereof. In some embodiments, the second image pyramid corresponds to a fusion of one or more previously generated image pyramids. In some embodiments, the image fusion circuit warps the first image pyramid to generate a warped image pyramid spatially more closely aligned with the second image pyramid than the first image pyramid. In some embodiments, the first image pyramid is warped based upon a set of warping parameters determined based upon a comparison of the first resampled image to an image corresponding to the second image pyramid.

The image fusion circuit performs 650 noise reduction on at least a portion of the fused image pyramid (e.g., an unscaled single-color image and a first downscaled multi-color image) to generate a denoised output image. In addition, in some embodiments, the fused image pyramid is stored in memory and made available for additional fusion.

FIG. 7 illustrates a process for performing image fusion using a raw image mode, in accordance with some embodiments. The image fusion circuit (e.g., image fusion circuit 400 of FIG. 4) receives 710 raw image data captured by one or more sensors corresponding to a first raw image. The raw image data may be received in a Bayer format. In some embodiments, the raw image data may undergo one or more preprocessing functions, such as raw noise filtering (RNF), lens shading correction (LSC), highlight recovery (HR), sensor linearization (SLIN), etc.

The image fusion circuit generates 720 a first raw image pyramid from the first raw image. The first raw image pyramid comprises a plurality of levels, including a first level corresponding to an unscaled raw image (e.g., the first raw image), and one or more additional levels corresponding to full-color successively downscaled versions of the first raw image. In some embodiments, each downscaled image is downscaled by a factor of two over each dimension relative to an image of a previous level of the pyramid, to have one quarter of the pixels as the previous level image. In some embodiments, the image fusion circuit stores the generated image pyramid in a memory or cache in preparation for image fusion.

The image fusion circuit fuses 730 the first raw image pyramid with a second raw image pyramid to generate a fused raw image pyramid. In some embodiments, the second raw image pyramid corresponds to an image received at a different time, captured using a different exposure level, or some combination thereof. In some embodiments, the second raw image pyramid corresponds to a fusion of one or more previously generated raw image pyramids. In some embodiments, the image fusion circuit warps the first raw image pyramid to generate a warped raw image pyramid spatially more closely aligned with the second raw image pyramid than the first raw image pyramid. In some embodiments, the first raw image pyramid is warped based upon a set of warping parameters determined based upon a comparison of the first raw image to a raw image corresponding to the second raw image pyramid.

The image fusion circuit performs 740 noise reduction on at least a portion of the fused image pyramid (e.g., an unscaled single-color image and a first downscaled multi-color image) to generate a denoised raw image. In addition, the fused image pyramid may be stored in memory and made available for additional fusion.

The image fusion circuit demosaics and resamples 750 the processed raw image to generate an output image. In some embodiments, the image fusion circuit demosaics the processed raw image to generate an image in the RGB color space. In some embodiments, the image fusion circuit, as part of the resampling, performs one or more color conversion operations on the demosaiced RGB image. For example, the image fusion circuit may convert the demosaiced RGB image into YCC image data to generate the output image. In some embodiments, the image fusion circuit may downscale the demosaiced RGB image during resampling.

As such, the image fusion circuit is configured to, based on operating mode, fuse images that have been demosaiced and resampled in the processed image mode, or fuse raw images in raw image mode. In raw image mode, by fusing the raw image data without demosaicing or resampling, image fusion is performed on a cleaner image signal that more accurately reflects the image data captured by the sensors. On the other hand, processing the raw image data requires a larger memory footprint. As such, applications that may not require the cleaner image signal of raw image mode may use processed image mode to demosaic and resample the images prior to pyramid generation and image fusion, to achieve a smaller memory footprint, and smaller memory bandwidth and less power consumption. For example, in some embodiments, image fusion in raw image mode is performed using 4 k image data, while image fusion in processed image mode, due to already being downscaled, may be performed using 1080p image data. As shown in FIGS. 5A and 5B, based on the operating mode the image fusion circuit is operating in, the various stages of the image fusion circuit are routed differently to generate different kinds of image pyramids (e.g., processed image pyramids in processed image mode, and raw image pyramids in raw image mode) and to perform operations in a different order (e.g., noise processing after or before demosaicing and resampling, based on the operating mode). As discussed above, the image fusion circuit may configure the routing between various components, as well as the functionality of certain components, based upon one or more control parameters indicating which mode the image fusion circuit is to operate in.

Example Architecture for Image Fusion Processing

As discussed above, components of the image fusion circuit may be configured to operate differently, based on which mode the image fusion circuit is operating in. For example, the image fusion processor 450 may perform different operations for fusing received image pyramids, based on whether the received image pyramids are processed image pyramids (e.g., generated by the pyramid generator 332) or raw image pyramids (e.g., generated by the raw pyramid generator 422). In some embodiments, the image fusion processor 450 comprises a control register configured to receive and store a control parameter indicating which mode the image fusion processor 450 is operating in. Operations performed by the image fusion processor to fuse different types of image pyramids in different modes are described in greater detail below.

As illustrated in FIG. 4, the image fusion processor 424 comprises a multi-scale image fusion circuit 802 and an image fusion circuit 803 for fusing the warped image pyramid 448 and the second image pyramid 444. The multi-scale image fusion circuit 802 is configured to fuse stages 1 through n of the received image pyramids (corresponding to downscaled full-color images), while the image fusion circuit 803 fuses scale 0 of the image pyramids (corresponding to unscaled single-color image of processed image pyramids, or unscaled raw images of raw image pyramids).

Figure 8A:
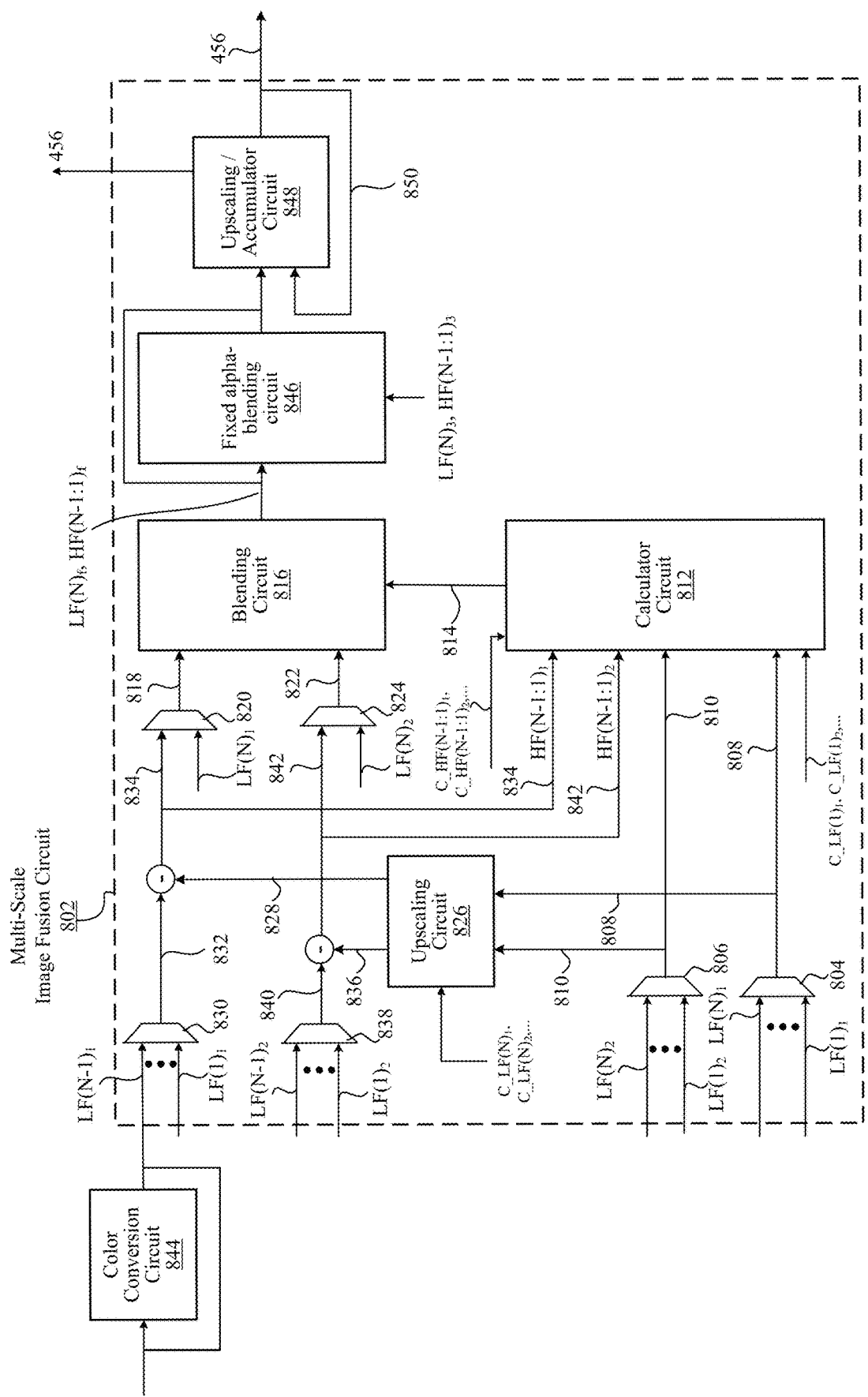
FIG. 8A is a detailed block diagram of multi-scale image fusion circuit as part of image fusion processing circuit, according to one embodiment.

FIG. 8A is a detailed block diagram of multi-scale image fusion circuit 802 as part of image fusion processing circuit 450, according to one embodiment. Multi-scale image fusion circuit 802 performs per pixel blending between each downscaled multi-color stage of warped image pyramid 448 with a corresponding downscaled multi-color stage of the second image pyramid 444 to generate downscaled multi-color stages of a fused image pyramid 452. For example, the multi-scale image fusion circuit 802 generates first downscaled stage of fused image pyramid 452 (e.g., first downscaled stage 456) by upscaling and accumulating the multiple downscaled stages of the fused image pyramid. The first downscaled stage of fused image pyramid 452 includes multiple color components and has a pixel resolution lower than a pixel resolution of unsealed stage of fused image pyramid 454 (unsealed single-color image in processed image mode, or unsealed raw image in raw image mode).

In some embodiments, the multi-scale image fusion circuit 802 is configured to blend pixels of the downscaled multi-color stages of the image pyramids in YCC color space. However, in the second raw image mode, the downscaled multi-color stages of the raw image pyramids may be in the RGB color space. Therefore, when operating in the second raw image mode, the image data of the downscaled multi-color stages of the received raw image pyramids are processed at a color conversion circuit 844 that converts the RGB image pyramid data into YCC image data prior to being received by the remaining components of the multi-scale image fusion circuit 802. On the other hand, in the first processed image mode, the downscaled stages of the processed image pyramids may already be in the YCC color space. As such, the color conversion circuit 844 is bypassed when the multi-scale image fusion circuit 802 operates in processed image mode. In addition, in raw image mode, the downscaled multi-colors stages of raw image pyramids that have been previously fused (e.g., a history image pyramid) may also be in the YCC color space. As such, the color conversion circuit 844 may also be bypassed in raw image mode for the first or second image pyramids.

Multi-scale image fusion circuit 802 receives low frequency components of the downscaled multi-color warped images $LF(1)_1, LF(2)_1, \ldots, LF(N)_1$ as part of warped image pyramid 448 (obtained by warping each stage of the first image pyramid 442), where N represents levels of downsampling performed on the stage of the warped image pyramid 448, e.g., for an image pyramid having seven stages 0 through 6, scale 0 would correspond to the unscaled single-color image of the pyramid, and N=6 represents 6 levels of downscaling. Multi-scale image fusion circuit 802 further receives low frequency components of the downscaled multi-color images $LF(1)_2, LF(2)_2, \ldots, LF(N)_2$ as part of the second image pyramid 444. The downscaled warped image with the lowest level of resolution $LF(N)_1$ is first passed via multiplexer 804 onto calculator circuit 812 as downscaled warped image data 808. The downscaled image with the lowest level of resolution $LF(N)_2$ is also passed via multiplexer 806 onto calculator circuit 812 as downscaled image data 810. The calculator circuit 812 further receives confidence values associated with the pixels of the received downscaled images ($LF(N)_1$ and $LF(N)_2$).

Calculator circuit 812 determines a patch distance for a pixel by processing photometric distances between pixels in a patch of downscaled warped image data 808 and corresponding pixels in a patch of downscaled image data 810. The patch of downscaled warped image data 808 includes the pixel as a central pixel and other pixels within defined spatial distance from the pixel. A patch distance represents a measure of similarity between two patches. In some embodiments, the patch distance between two patches is determined based upon distances between respective pixels of the two patches (e.g., a sum of Euclidian distances between corresponding pixels in both patches). In some embodiments, the calculator circuit 812 determines patch distances using different patch sizes based upon a scale of the image pyramids being processed.

Calculator circuit 812 also determines a cross-correlation value (e.g., normalized cross-correlation, or NCC) for the pixel by determining a cross variance between pixel values of the patch of downscaled warped image data 808 and pixel values of the patch of downscaled image data 810. The NCC is used as a secondary measure of patch similarity.

Calculator circuit 812 determines blend parameters 814 for the pixel as a function of one or more similarity measures, e.g., the patch distance PD and the NCC. If the patches are more similar, a higher level of blending is performed to avoid ghosting, and vice versa. In some embodiments, the calculator circuit determines a similarity score S based upon the determined patch distance PD and normalized cross correlation NCC of the patches, where S is a value between 0 and 1 (0 indicating that the patches are completely dissimilar, and 1 indicating that the patches are identical).

In some embodiments, the blend parameters 814 are further based upon received confidence values corresponding to the pixels of the patch of downscaled warped image data 808 and corresponding pixels of the patch of downscaled image data 810. For example, the calculator circuit 812 may determine blend parameter 814 for a pixel as a normalized combination of a weight W1 for the pixel of a first image and a weight W2 for a pixel of a second image, where the weights W1 and W2 are based on desired pre-programmed values and adjusted based upon the confidence value of the respective pixels.

In some embodiments, the weights W1 and W2 are modified by the determined similarity score S, to generate the actual per pixel weight values w1 and w2 to be used for blending that takes into account confidence and similarity. For example, the blend parameters may be determined such that if the patches are completely dissimilar (e.g., S=0), then only the pixel from the reference image is used (e.g., where the second image is the reference image, setting W1 to 0). On the other hand, if the patched are completely similar (e.g., S=1), then fusion may be performed without modifying the weights W1 and W2.

Blend parameters 814 for the pixel are generated based on the weights W1 and W2, and are passed onto blending circuit 816. Blending circuit 816 blends pixel value 818 of the pixel of the downscaled warped image $LF(N)_1$ (passed via multiplexer 820 onto blending circuit 816) with pixel value 822 of a corresponding pixel of the downscaled image $LF(N)_2$ (passed via multiplexer 824 onto blending circuit 816) using blend parameter 814 for the pixel as determined by the calculator circuit 812, to generate a blended pixel value for a pixel of a downscaled fused image with the lowest level of resolution $LF(N)_f$. Blending circuit 816 blends a pair of pixel values $x_1(i,j)$ and $x_2(i,j)$ in two different images (e.g., images $LF(N)_1, LF(N)_2$) corresponding to the same spatial coordinate (i,j) in both images using blend parameters 814 to a obtain a blended pixel value b(i,j).

The downscaled warped image $LF(N)_1$ and downscaled image $LF(N)_2$ are also passed (via multiplexers 804 and 806) as downscaled warped image data 808 and downscaled image data 810 onto upscaling circuit 826. Upscaling circuit 826 upscales downscaled warped image data 808 two times in both horizontal and vertical dimensions to generate upscaled warped image data 828 (scale N-1). In addition, the upscaling circuit 826 further receives the confidence values corresponding to the pixels of the patch of downscaled warped image data 808, and upscales the confidence values along with the pixels of the downscaled image, such that each pixel of the upscaled image is associated with an upscaled confidence value.

Multiplexer 830 passes downscaled warped image $LF(N-1)_1$ as downscaled warped image data 832. Pixel values of upscaled warped image data 828 are subtracted from corresponding pixel values of downscaled warped image data 832 (scales N-1) to generate warped image data 834 representing a high frequency component of downscaled warped image $HF(N-1)_1$ passed onto calculator circuit 812 and onto blending circuit 816 (via multiplexer 820) as pixel values 818.

Similarly, upscaling circuit 826 also upscales downscaled image data 810 to generate upscaled image data 836 (scale N-1), as well as the confidence values corresponding to the pixels of the patch of downscaled image data 810 (such that each pixel of the upscaled image data 836 is associated with an upscaled confidence value). Multiplexer 838 passes downscaled image $LF(N-1)_2$ as downscaled image data 840, from which pixel values of upscaled image data 836 are subtracted to generate image data 842 representing a high frequency component of downscaled image $HF(N-1)_2$ passed onto calculator circuit 812 and onto blending circuit 816 (via multiplexer 824) as pixel values 822.

Calculator circuit 812 determines a patch distance for a pixel of warped image data 834 by processing photometric distances between pixels in a patch of warped image data 834 (e.g., the high frequency component of downscaled warped image $HF(N-1)_1$) and corresponding pixels in a patch of image data 842 (e.g., the high frequency component of downscaled image $HF(N-1)_2$). The downscaled warped image $LF(N-1)_1$ is further passed via multiplexer 804 onto calculator circuit 812 as downscaled warped image data 808. The downscaled image $LF(N-1)_2$ is also passed via multiplexer 806 onto calculator circuit 812 as downscaled image data 810. Calculator circuit 812 determines a cross-correlation value (e.g., NCC) for the pixel by determining a cross variance between pixel values of a patch of downscaled warped image data 808 (e.g., the low frequency component of the downscaled warped image $LF(N-1)_1$) and pixel values of the patch of downscaled image data 810 (e.g., the low frequency component of the downscaled image $LF(N-1)_2$).

Calculator circuit 812 determines blend parameter 814 for the pixel as a function of the patch distance, NCC, and the weight values associated with the pixels of the received images, for high frequency components of the downscaled warped image HF $(N-1)_1$ and the downscaled image $HF(N-1)_2$, which are passed onto blending circuit 816. Blending circuit 816 blends pixel value 818 of the pixel of the high frequency component of downscaled warped image $HF(N-1)_1$ with pixel value 822 of a corresponding pixel of the high frequency component of downscaled image $HF(N-1)_2$ using blend parameter 814 for the pixel to generate a blended pixel value for a pixel of a high frequency component of downscaled fused image $HF(N-1)_f$. This process of determining blending parameters 814, upscaling by upscaling circuit 826 and per-pixel blending by blending circuit 816 is recursively repeated until a high frequency component of a first downscaled version of fused image $HF(1)_f$ is generated.

As such, the blending circuit 816 generates blended pixel values of a downscaled fused image with the lowest level of resolution $LF(N)_f$ and blended pixel values of high frequency components of downscaled fused images of remaining levels of resolution $HF(N-1)_f$ through $HF(1)_f$. In some embodiments, the blended pixel data corresponds to a partial fusion, and is transmitted to a fixed alpha-blending circuit 846 configured to blend the blended pixel data (of the downscaled images of the warped image pyramid and second image pyramid) with downscaled image pixel data of a third image pyramid (e.g., $LF(N)_3$ and $HF(N-1:1)_3$). In some embodiments, the third image pyramid corresponds to a previously-performed partial fusion, and the alpha-blending is performed as part of an image processing application such as a finite impulse response (FIR) application (discussed in greater detail below in relation to FIG. 11 and FIGS. 12A-12B). The blending is performed with fixed blending parameters, and thus does not require any patch distance calculation or NCC performed by the calculator circuit 812. The results of the fixed alpha-bending (comprising LF(N) and HF(N-1:1) for the blended image data) are transmitted to the upscaling/accumulator circuit 848. In other applications (e.g., non-FIR applications), the fixed alpha-blending circuit 846 is bypassed, where the output of the blending circuit 816 (e.g., $LF(N)_f$ and $HF(N-1:1)_f$) is transmitted directly to the upscaling/accumulator circuit 848.

The upscaling/accumulator circuit 848 performs the process of image restoration to generate first downscaled version 456 of the fused image using fused downscaled versions $LF(N)_f$, $HF(N-1)_f$, $HF(N-2)_f$, . . . , $HF(1)_f$.

Figure 10:
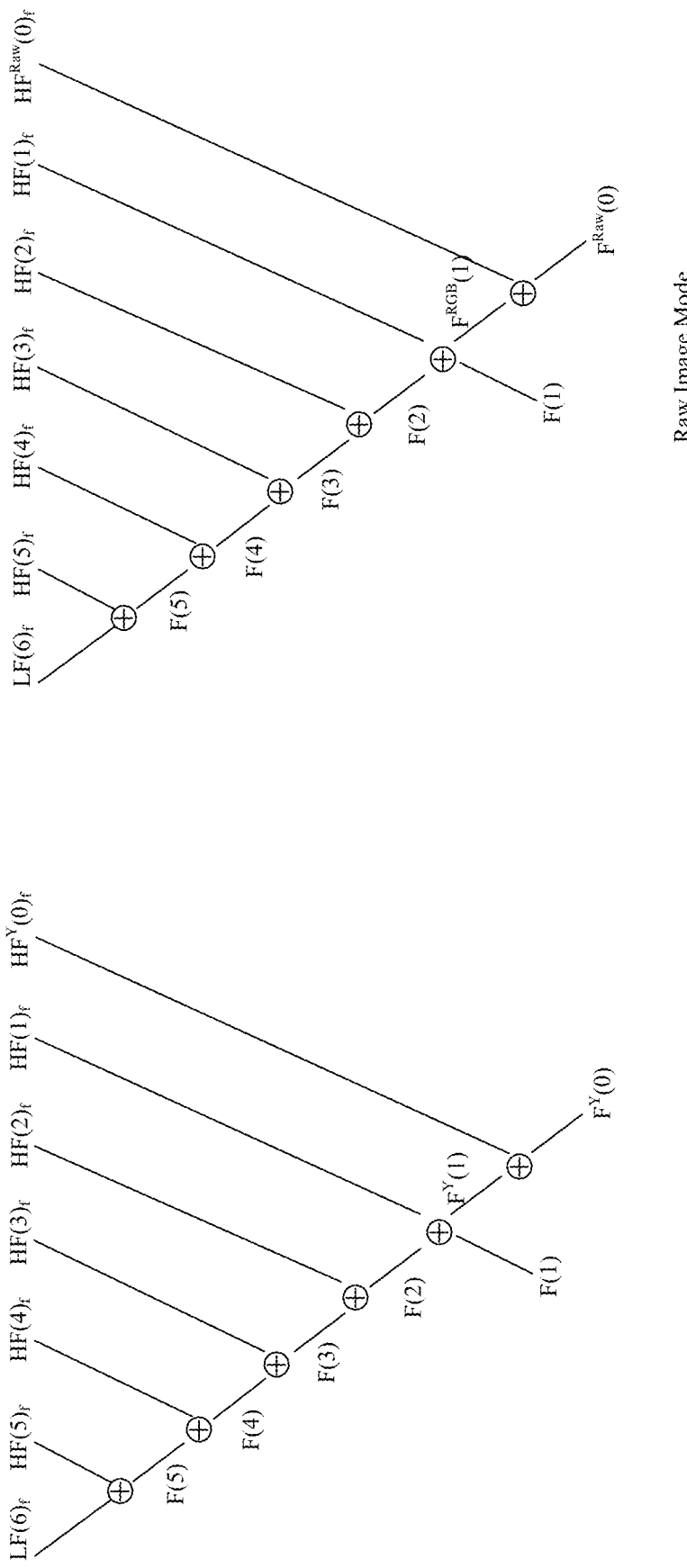
FIG. 10 is a conceptual diagram illustrating recursively upscaling and accumulating downscaled images as part of image fusion processing, according to one embodiment.

FIG. 10 is a conceptual diagram illustrating recursively upscaling and accumulating downscaled images as part of image fusion processing, according to one embodiment. While the fused image for the lowest downscaled level (e.g., level 6) of the fused image pyramid may be obtained by fusing the corresponding images of the two image pyramids to be used, fused upper level images of the fused image pyramid may be obtained by fusing the high frequency image data and then combining the fused high frequency component of level N with the fused pyramid scale N+1 from the previous fusion step, as illustrated in FIG. 10. In the example of FIG. 10, blending circuit 816 generates fused downscaled versions $LF(6)_f$, $HF(5)_f$, $HF(4)_f$, . . . , $HF(1)_f$ (based on blending parameters 814 as determined by the calculator circuit 812 using the similarity measures and confidence values of the received image pyramids) passed onto upscaling/accumulator circuit 848. Upscaling/accumulator circuit 848 upscales fused downscaled version $LF(6)_f$ two times in both horizontal and vertical dimensions and sums its upscaled version with fused downscaled version $HF(5)_f$ to generate downscaled fused image 850, e.g., F(5). Upscaling/accumulator circuit 848 upscales downscaled fused image 850 (e.g., F(5)) two times in both horizontal and vertical dimensions and sums its upscaled version with fused downscaled version $HF(4)_f$ to generate a new downscaled fused image 850, e.g., F(4). This process is repeated until upscaling/accumulator circuit 848 generates first downscaled version of fused image 456, e.g., fused image F(1). In addition, the upscaling/accumulator circuit 848 may upscale and accumulate confidence values for each of the fused downscaled low-frequency and high-frequency images to determine confidence values for the downscaled fused images.

The resulting images F(1) and $F^Y(0)$ (in processed image mode) or $F^{Raw}(0)$ (in raw image mode) may correspond to the first downscaled image 456 and the unscaled image 454 (single color image in processed image mode, or raw image in raw image mode) of the fused image pyramid 452 sent to the noise reduction circuit 458. In addition, these images, as well as the various downscaled fused images (e.g., F(5), F(4), . . . ), may also be transmitted to the pyramid storage circuit 334 as the fused pyramid 452 to be stored for subsequent fusion operations.

As discussed above, the multi-scale image fusion circuit 802 is able to blend the downscaled images of either processed image pyramids (in processed image mode) or raw image pyramids (in raw image mode). In processed image mode, the multi-scale image fusion circuit 802 receives downscaled images in the YCC color space, and performs the blending functions discussed above in the YCC color space. On the other hand, when in raw image mode, the multi-scale image fusion circuit 802 converts the downscaled images of the raw image pyramids from an RGB color space to a YCC color space (e.g., using color conversion circuit 844), allowing the multi-scale image fusion circuit 802 to then perform the blending functions in the YCC color space in the same manner is in processed image mode.

In some embodiments, while downscaled images of raw image pyramids in raw image mode are initially received in the RGB color space, the multi-scale image fusion circuit 802 outputs fused images (e.g., F(1), F(2), etc.) in the YCC color space. In applications where the fused raw image pyramid 452 is transmitted to the pyramid storage circuit 334 to be stored for subsequent fusion, the downscaled images of the fused raw image pyramid 452 may comprise images in the YCC color space instead of an RGB color space. The multi-scale image fusion circuit 802 may thus, when performing fusion involving a previously fused raw image pyramid, bypass the color conversion circuit 844 when receiving downscaled image data of the previously fused raw image pyramid.

Figure 8B:
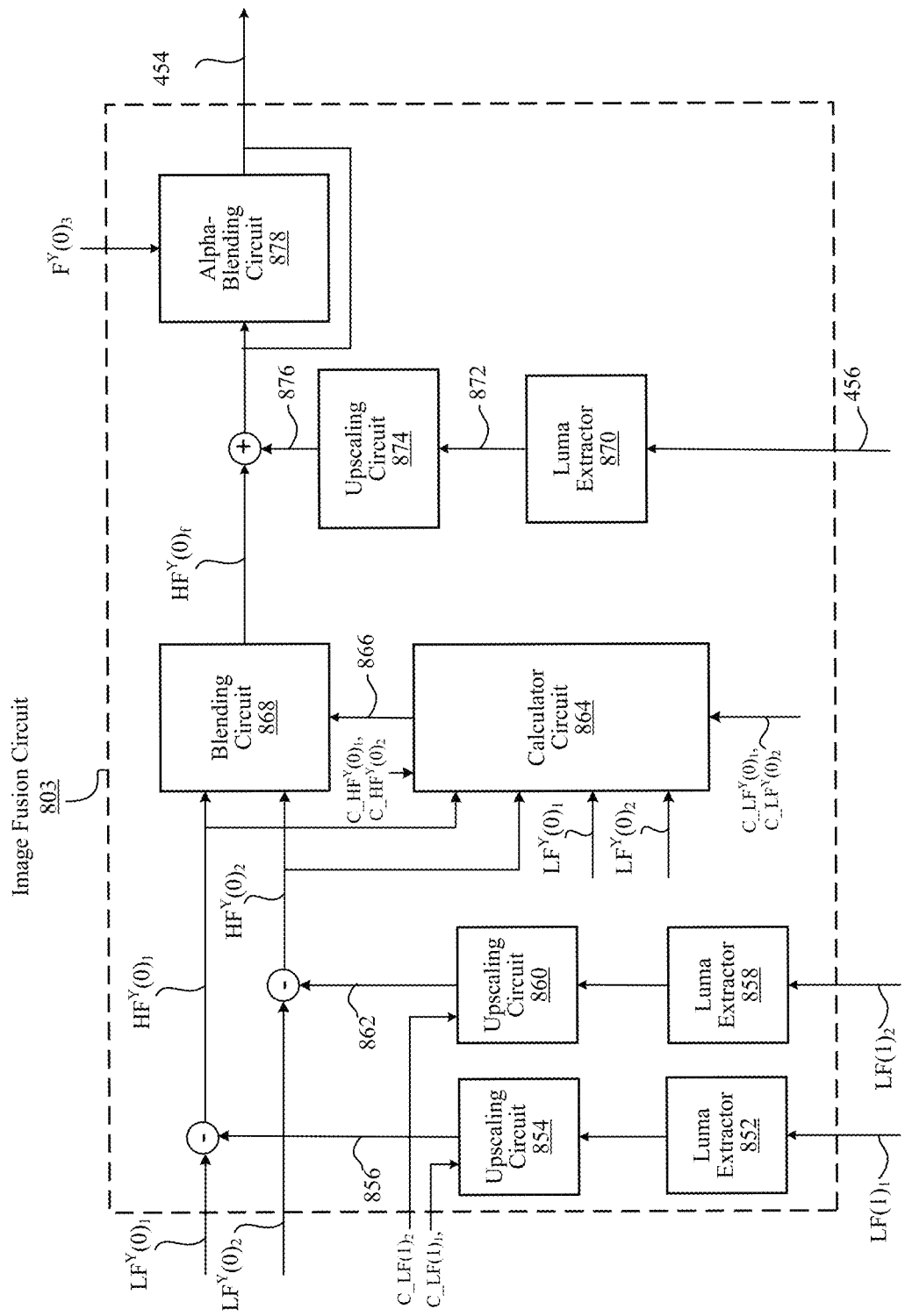
FIG. 8B is a detailed block diagram of image fusion circuit as part of image fusion processor operating in the first processed image mode, according to one embodiment.

FIG. 8B is a detailed block diagram of image fusion circuit 803 as part of image fusion processor 450 operating in the first processed image mode, according to one embodiment. In the first processed image mode, image fusion circuit 803 performs per pixel blending between unscaled single color images (e.g., luma component) of the warped image pyramid 448 and the second image pyramid 444 to generate unscaled single color fused image 454. Image fusion circuit 803 receives, as part of warped image pyramid 448 and the second image pyramid 444, unscaled single color version $LF^Y(0)_1$ and unscaled single color version $LF^Y(0)_2$, respectively. Image fusion circuit 803 further receives, downscaled warped image $LF(1)_1$ of warped image pyramid 448 and downscaled image $LF(1)_2$ of the second image pyramid 444.

Luma extractor circuits 852 and 858 extract a single color component (luma component) from downscaled images $LF(1)_1$ and $LF(1)_2$, respectively, to generate single color version of the downscaled images passed onto upscaling circuits 854 and 860. Upscaling circuits 854 and 860 upscale the single color version of the downscaled images twice in both spatial dimensions to generate single color version of upscaled warped images 856 and 862. In addition, the upscaling circuits 854 and 860 receive and upscale confidence values associated with the downscaled images $LF(1)_1$ and $LF(1)_2$ to generate upscaled confidence value for each upscaled image. Pixel values of single color version of upscaled images 856 and 862 are subtracted from corresponding pixel values of unscaled single color images $LF^Y(0)_1$ and $LF^Y(0)_2$, respectively, to generate a high frequency component of the unscaled single color images $HF^Y(0)_1$ and $HF^Y(0)_2$ passed onto calculator circuit 864 and blending circuit 868. In addition, the confidence values of $HF^Y(0)_1$ and $HF^Y(0)_2$ may be determined based on a minimum of the confidence values for $LF^Y(0)_1$ and the upscaled $LF(1)_1$, and a minimum of the confidence values for $LF^Y(0)_2$ and the upscaled $LF(1)_2$, respectively. The unscaled single color images $LF^Y(0)_1$ and $LF^Y(0)_2$, and their respective confidence values, are also passed onto calculator circuit 864.

Calculator circuit 864 determines a patch distance for a pixel by processing photometric distances between pixels in a patch of the high frequency component of unscaled single color version of warped image $HF^Y(0)_1$ and corresponding pixels in a patch of the high frequency component of unscaled single color version $HF^Y(0)_2$, in the same manner as calculator circuit 812 of multi-scale image fusion circuit 802 except that calculator circuit 864 processes single color images whereas calculator circuit 812 processes multi-color images. Calculator circuit 864 also determines a cross-correlation value (NCC) for the pixel by determining a cross variance between pixel values of a patch of unscaled single color version $LF^Y(0)_1$ and corresponding pixel values of a patch of unscaled single color version $LF^Y(0)_2$. Calculator circuit 864 determines blend parameter 866 for the pixel based on similarity metrics (e.g., the patch distance and the cross-correlation value) and confidence values associated with the received image data ($HF^Y(0)_1$ and $HF^Y(0)_2$) that are passed onto blending circuit 868. Blending circuit 868 blends a pixel value of the pixel of the high frequency component of unscaled single color version of warped image $HF^Y(0)_1$ with a pixel value of a corresponding pixel of the high frequency component of unscaled single color version $HF^Y(0)_2$ using blend parameter 866 for the pixel to generate a blended pixel value for a pixel of a high frequency component of unscaled single color version of fused image $HF^Y(0)_f$. Blending circuit 868 operates in the same manner as blending circuit 816 of multi-scale image fusion circuit 802 except that blending circuit 568 performs per pixel blending of single color images whereas blending circuit 816 performs per pixel blending of multi-color images.

Image fusion circuit 803 also receives first downscaled version of fused image 456 generated by multi-scale image fusion circuit 802. Luma extractor circuit 870 extracts a single color component (luma component) from first downscaled version of fused image 456 to generate single color version of first downscaled version of fused image 872 passed onto upscaling circuit 874, which upscales the single color version of first downscaled version of fused image 872 twice in both spatial dimensions (horizontal and vertical dimensions) to generate a single color version of upscaled fused image 876. Pixel values of single color version of upscaled fused image 876 are summed with corresponding pixel values of the high frequency component of unscaled single color version of fused image $HF^Y(0)_f$ to generate unscaled single color version of fused image 454.

As further shown in FIG. 10, a single color component (e.g., luma component) is extracted (via luma extractor circuit 870) from the first downscaled multi-color version of fused image F(1) to generate a first downscaled single color version of fused image $F^Y(1)$. The first downscaled single color version of fused image is upscaled (via upscaling circuit 874) and summed to the high frequency component of unscaled single color version of fused image $HF^Y(0)_f$ to generate an unscaled single color version of fused image $F^Y(0)$, e.g., unscaled single color version 454. The resulting fused images $F^Y(0)$, F(1), F(2), ... F(5) collectively form the fused image pyramid 452.

In some embodiments, the image fusion circuit 803 further comprises a fixed alpha-blending circuit 878 configured to blend the unscaled single color version of fused image 454 with the unscaled single color image of a third image pyramid (e.g., $(F^Y(0)_3)$. The fixed alpha-blending circuit 878 may be similar to the fixed alpha-blending circuit 846 illustrated in FIG. 8A. As discussed above, in some embodiments, the third image pyramid corresponds to a previously-performed partial fusion, and the alpha-blending is performed as part of certain image processing applications (e.g., certain FIR applications). The blending is performed with fixed blending parameters, and thus does not require any patch distance calculation or NCC performed by the calculator circuit 864. The results of the fixed alpha-bending (comprising fused unscaled single color image data) are output by the image fusion circuit 803 (e.g., to be used in noise processing). In other applications (e.g., non-FIR applications), the fixed alpha-blending circuit 878 is bypassed.

Figure 9:
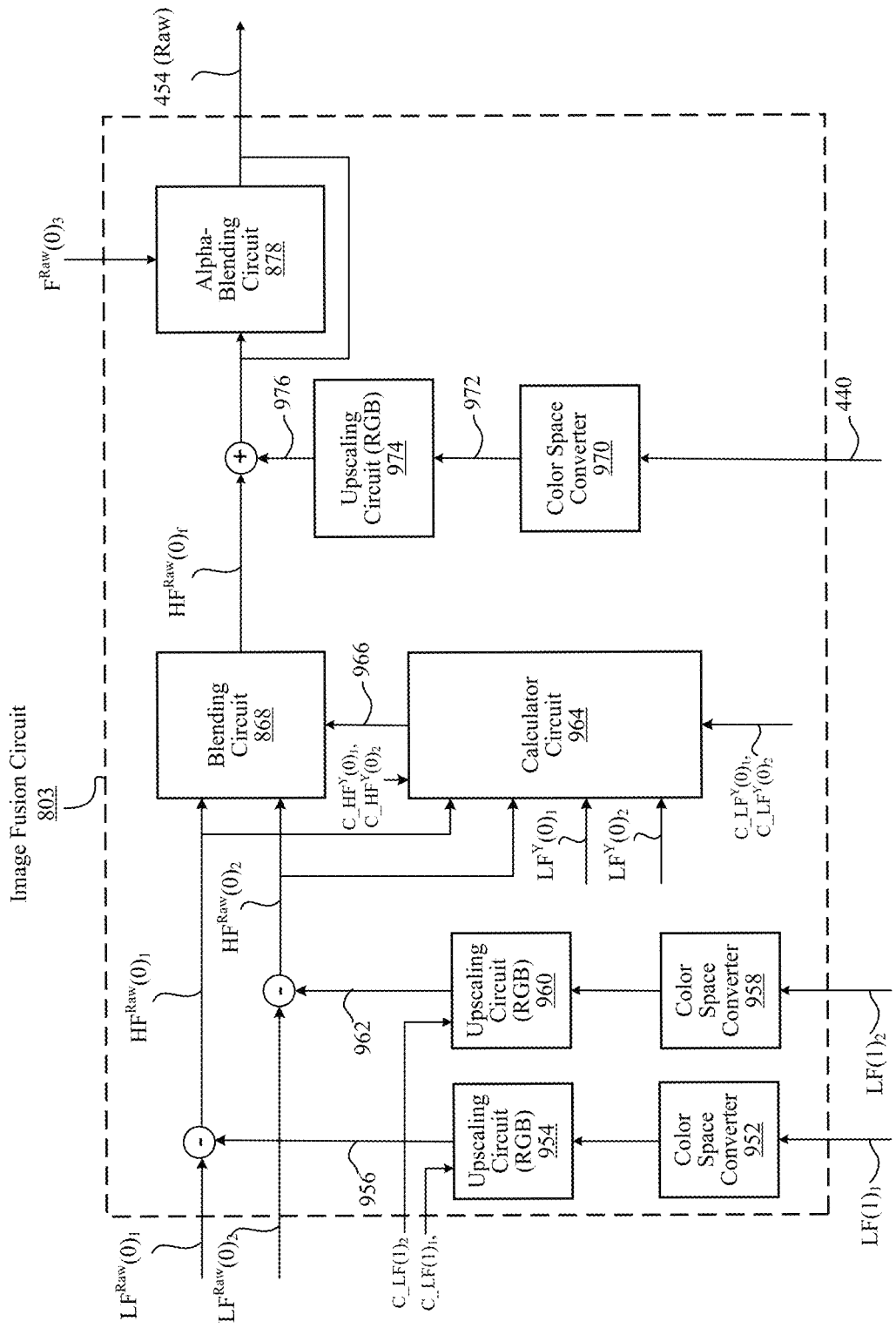
FIG. 9 illustrates a detailed block diagram of image fusion circuit as part of image fusion processor operating in the second raw image mode, according to one embodiment.

When operating in raw image mode, the image fusion circuit 803 processes received image data differently, due to the top scale of the raw image pyramids comprising raw image data instead of single color image data. FIG. 9 illustrates a detailed block diagram of image fusion circuit 803 as part of image fusion processor 450 operating in the second raw image mode, according to one embodiment. Similar to processed image mode, the image fusion circuit 803 in raw image mode determines high frequency components of the unscaled raw images of the raw image pyramids (i.e., $HF^{Raw}(0)_1$ and $HF^{Raw}(0)_2$) based on a difference between the unsealed raw images (i.e., $LF^{Raw}(0)_1$ and $LF^{Raw}(0)_2$) and respective upscaled versions of the first downscaled levels of the raw image pyramids (i.e., upscaled versions of $LF(1)_1$ and $LF(1)_2$). However, the pixels of the unsealed raw image of the raw image pyramids may comprise color channel data (R, G, or B), in contrast to the unsealed image of the processed image pyramid, which comprise luminance (Y) data. On the other hand, as discussed above, the multi-scale image fusion circuit 802 processes the downscaled levels of the raw image pyramids by converting the RGB image data of the downscaled levels into YCC color space data. As such, the image fusion circuit 803 may receive the image data for the first downscaled levels of the raw image pyramids $LF(1)_1$ and $LF(1)_2$ in YCC color space.

Instead of extracting luminance components from the received image data (using luminance extractors 852/858 as done in processed image mode shown in FIG. 8B), the image data of the images is processed at respective color space converters 952 and 958 that convert the YCC image data into RGB image data. In addition, the converted RGB image data is upscaled by upscaling circuits 954 and 960, which upscale the image data in RGB space (in contrast with upscaling circuits 854 and 860 illustrated in FIG. 8B, which upscale single-component image data, e.g., luminance component only). The resulting upscaled RGB image data 956 and 962 is subtracted from the unsealed raw image data $LF^{Raw}(0)_1$ and $LF^{Raw}(0)_2$, respectively, (e.g., by subtracting the color component for each pixel of the upscaled RGB data from the color component of the raw image data), to generate the high frequency components of the unsealed raw images of the raw image pyramids $HF^{Raw}(0)_1$ and $HF^{Raw}(0)_2$. The determined high frequency components are received by the blending circuit 868 and calculator circuit 964. In some embodiments, if RGB image data for the first downscaled levels for a raw image pyramid being fused is available (e.g., if the raw image pyramid has not been previously fused, RGB data for the downscaled levels is available prior to being processed by the color conversion circuit 844), the color space converters 952 and 958 may be bypassed, and the first downscaled level RGB image data is provided directly to the upscaling circuits 952 and 960.

The calculator circuit 964 determines a patch distance for a pixel by processing photometric distances between pixels in a patch of the high frequency component of unsealed single color version of warped image $HF^{Raw}(0)_1$ and corresponding pixels in a patch of the high frequency component of unsealed single color version $HF^{Raw}(0)_2$, similar to operations of the calculator circuit 864 illustrated in FIG. 8B used during processed image mode. However, because the calculator circuit 964 receives raw image data where different pixels correspond to different color channels (instead of single-component image data), the calculator circuit 964, when determining patch distance, instead of determining distances between each pixel of the respective patches, determines a respective distance between pixels of respective color channels of the raw image data, e.g., a first distance between red pixels of the respective patches, a second distance between green pixels, and a third distance between blue pixels. The three values (corresponding to R, G, and B) are aggregated (e.g., using root sum of squares) to generate an aggregate patch distance value.

In addition, calculator circuit 964 also determines a cross-correlation value (NCC) for the pixel by determining a cross variance between pixel values of a patch of unsealed raw image $LF^{Raw}(0)_1$ and corresponding pixel values of a patch of unsealed raw image $LF^{Raw}(0)_2$. In some embodiments, the cross-correlation value is determined based on aggregated patch distances (e.g., aggregated R, G, and B patch distances), and can be determined in the same way as in processed image mode. The calculator circuit 964 determines blend parameter 966 for the pixel based on similarity metrics (e.g., the patch distance and the cross-correlation value) and confidence values associated with the received image data that are passed onto blending circuit 868. Blending circuit 868 blends a pixel value of the pixel of the high frequency component of unsealed single color version of warped image $HF^{Raw}(0)_1$ with a pixel value of a corresponding pixel of the high frequency component of unsealed single color version $HF^{Raw}(0)_2$ using blend parameter 966 for the pixel to generate a blended pixel value for a pixel of a high frequency component of unsealed single color version of fused image $HF^{Raw}(0)_f$. Blending circuit 868 operates in the same manner as in raw image mode as in processed image mode, except that the per pixel blending is performed on raw image data instead single-component image data.

In some embodiments, components of the image fusion circuit 803 illustrated in FIG. 9 (e.g., color space converters 952/958, RGB upscaling circuits 954/960, calculator circuit 964) may be implemented different components as their counterparts in FIG. 8B (e.g., luma extractors 852/858, single-component upscaling circuits 854/860, calculator circuit 864). For example, the image fusion circuit 803 may comprise luma extractors 852/858 and color space converters 952/958 implemented as separate, parallel components, wherein image data is routed to the luma extractors or the color space converters based on the operating mode of the image fusion circuit 803. However, it is understood that in some embodiments, some of these components may be implemented as part of a single circuit configured to operate in different modes, e.g., an upscaling circuit that upscales a single component in a first mode and RGB components in a second mode, a calculator circuit configured to calculate patch distances differently based on the operating mode of the image fusion circuit, etc. In some embodiments, the image fusion circuit 803 configures the operation of each component, or routing between components, based upon a stored control parameter indicating the operating mode of the image fusion circuit.

In some embodiments, in either the first processed image mode or the second raw image mode, the image fusion processor 450 outputs only the unscaled top level image 454 (e.g., single color image $F^Y(0)$ in processed image mode, or raw image $F^{Raw}(0)$ in raw image mode) and the processed first downscaled image 456 (F(1)) of the fused image pyramid 452 to the noise reduction circuit 458 for noise reduction and additional processing (e.g., output as a fused output image in processed image mode, or subsequently demosaiced and resampled in raw image mode). On the other hand, the fused images F(5), F(4), . . . , F(1) and $F^Y(0)$ or $F^{Raw}(0)$ generated by the upscaling/accumulator circuit 848 may be assembled to form the fused image pyramid 452, which may be provided to the pyramid storage circuit 334 to be stored in memory. This allows for the fused image pyramid 452 to function as a history pyramid that may be later provided to the noise processing stage 310 as the first image pyramid 442 or the second image pyramid 444 to be fused with additional images (e.g., image pyramid 418 or raw image pyramid 426 generated based on received images 402), or, in certain applications, as a third image pyramid to be used for fixed alpha-blending with a generated partial fusion. In some embodiments, the image fusion processor 450 may output the entire fused image pyramid 452 to the noise reduction circuit 458.

Configurable Temporal Processing Applications

The image fusion circuit 400 is configurable to able to perform a variety of temporal processing applications on received image data, based on instructions from a controller (e.g., central controller 320). These temporal processing applications may include a "no temporal processing" mode, a two-image fusion mode (e.g., for generating HDR images), a temporal filtering application (e.g., in which the image fusion circuit maintains a history frame corresponding to a fusion result of a previous temporal filtering step, and, as additional images are received, fused with the history frame), an IIR temporal processing application (e.g., where the image fusion circuit 400 receives sets of images, each set comprising a frame 0 to frame n, and fuses each set of images to form a merged image that is output for spatial processing), and/or an FIR temporal processing application (e.g., where the image fusion circuit fuses a set of n images in n−1 passes to generate n−1 partial fusion results, each corresponding to a fusion of a reference frame of the set to another image of the set, and accumulates the partial fusion results to generate a final fused image that is output for spatial processing). Each of these temporal processing applications may be performed in either processed image mode or in raw image mode.

As discussed above, in some embodiments, the image fusion processor 450 comprises fixed alpha-blending circuit (e.g., fixed alpha-blending circuits 846 and 878) used in certain image processing applications, such as FIR, to alpha-blend a fused image pyramid data generated by blending images of a (warped) first image pyramid and a second image pyramid with image data of a third image pyramid. Because the blending is performed using fixed alpha-blending parameters, and as such does not involve the calculation of patch distances or NCC, the fixed alpha-blending is much simpler in comparison to the initial blending of the first and second image pyramids. By implementing the fixed alpha-blending circuits within the image fusion circuit, image fusion and alpha-blending can be performed in one pass through the image fusion circuit (e.g., during one clock cycle), reducing a number of clock cycles needed for FIR applications.

Figure 11:
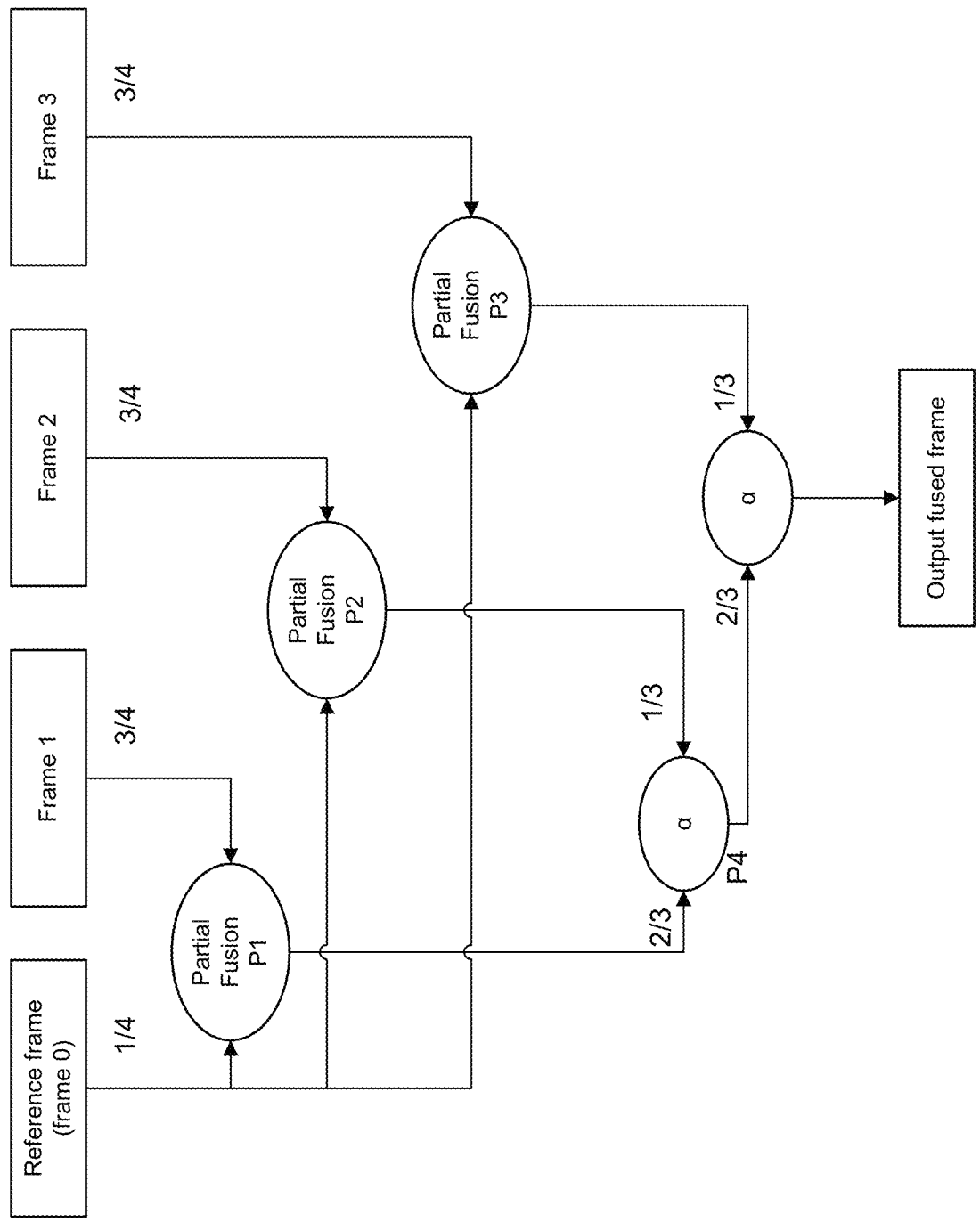
FIG. 11 illustrates the partial fusion and accumulation steps that may be performed for FIR temporal processing, in accordance with some embodiments.

FIG. 11 illustrates the partial fusion and accumulation steps that may be performed for FIR temporal processing, in accordance with some embodiments. In the illustrated example, FIR is to be performed on a set of n=4 images (four images corresponding to frames 0 to 3), where a first image (frame 0) is designated as the reference frame. As illustrated in FIG. 11, the reference frame 0 is fused with each of the remaining frames to form n−1 (e.g., 3) partial fusions (e.g., partial fusions P1, P2, and P3). In some embodiments, the images for each partial fusion are weighted. For example, because the reference frame 0 contributes to each of the partial fusions P1, P2, and P3, while the remaining image frames contribute only to one partial fusion each of P1, P2, and P3, the reference frame 0 may be assigned a lower weight in each partial fusion, in order to balance the contribution of each image to the final fused image. For example, as illustrated in FIG. 11, the reference frame 0 is given a weight of ¼ for partial fusions P1, P2, and P3, while the remaining images (frame 1, frame 2, and frame 3) are each given a weight of ¾ for their respective partial fusions.

The partial fusion results are accumulated (e.g., alpha-blended) to generate a final output fused image frame. For example, as illustrated in FIG. 11, partial fusions P1 and P2 are fused to form a partial fusion P4, which is then fused with partial fusion P3 to generate the fused output image. In some embodiments, accumulation of the partial fusion results is based upon weights of the partial fusions. For example, partial fusion P1 may be given a weight of ⅔, and partial fusion P2 given a weight of ⅓ when accumulated to form P4, while P4 is given a weight of ⅔ and P3 a weight of ⅓ when accumulated to form the fused output image. As discussed above, accumulation of partial fusion results may be performed using fixed alpha-blending, and is thus simplified in comparison to the fusion of the received images to produce the partial fusion P1 through P3. For example, in some embodiments, while normal image fusion to produce the partial fusion results P1 through P3 may be performed with ghost detection, the accumulation of the partial fusion results may be performed without ghost detection, due to each partial fusion result being aligned with the reference frame 0.

Figure 12A:
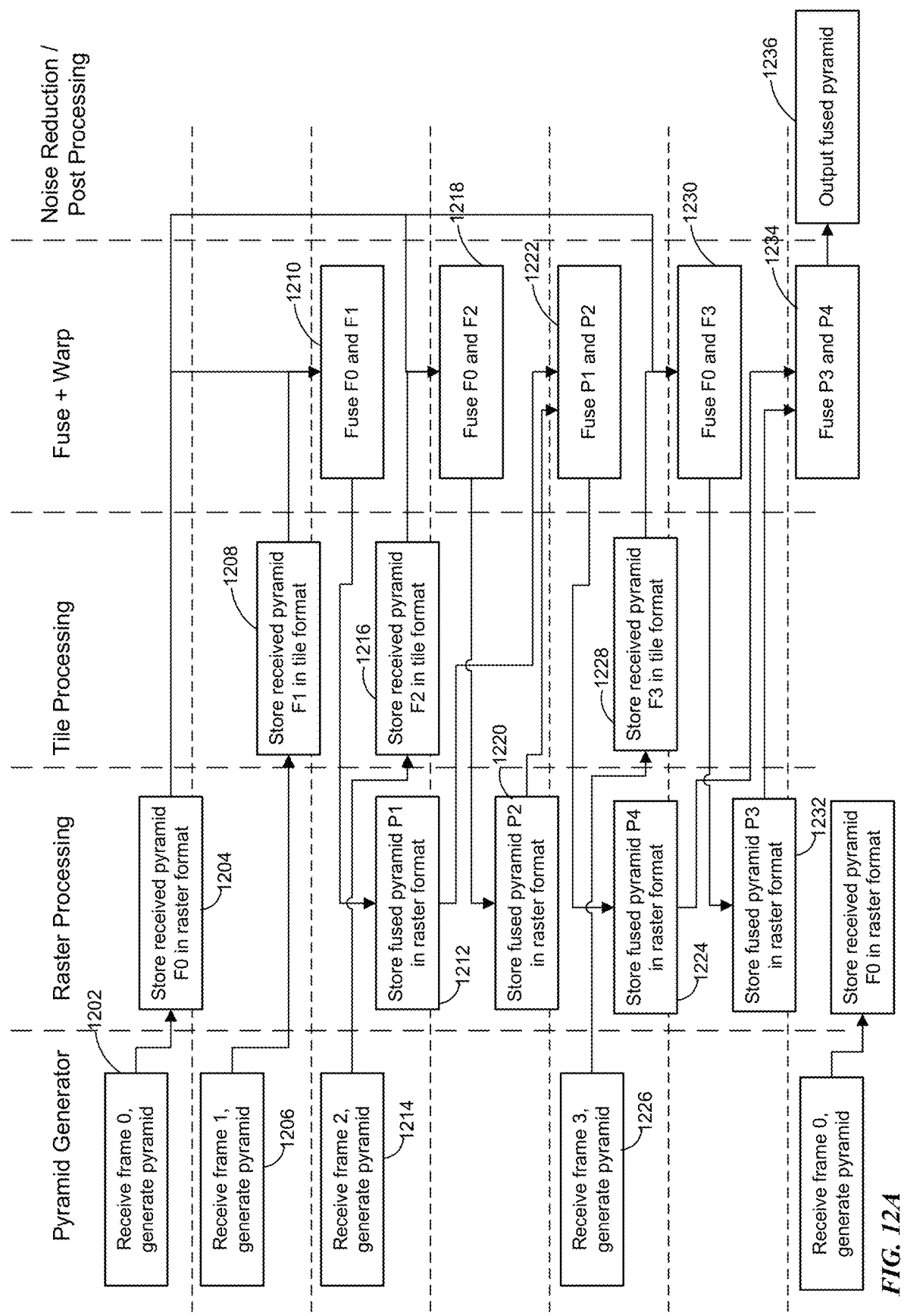
FIG. 12A illustrates a diagram describing an FIR temporal processing application that may be performed by the image fusion circuit, in accordance with some embodiments where the image fusion processor does not include fixed alpha-blending circuit.

If the image fusion processor 450 does not include the fixed alpha-blending circuits 846/878, the partial fusions and accumulations illustrated in FIG. 11 may be each performed in separate passes through the image fusion processor 450. For example, each partial fusion may be performed using the image fusion processor 450 to fuse first/second image pyramids 442/444 as discussed above in relation to FIGS. 8A-8B and 9. On the other hand, the image fusion processor 450 may perform alpha-blending where the blending circuits use fixed blend parameters (e.g., instead of blend parameters calculated by the calculate circuit based on patch distances and/or NCC). FIG. 12A illustrates a diagram describing an FIR temporal processing application that may be performed by the image fusion circuit 400, in accordance with some embodiments where the image fusion processor 450 does not include the fixed alpha-blending circuits 846/878. In the FIR application, a set of images (e.g., frames 0 to n) are fused in n−1 passes to generate n−1 partial fusion results, each corresponding to a fusion of a reference frame of the set (e.g., frame 0) to another image of the set. The partial fusion results are accumulated (over n−2 passes) to final fused image that is output for spatial processing. In the illustrated embodiment, a set of images contains four images (frames 0 to 3), resulting in the performance of three passes for partial fusion, and two passes for accumulation. Due to the additional fusion passes when performing FIR (e.g., 5 fusion operations to fuse a set of 4 images), the image fusion circuit 400 may receive images at a reduced rate in comparison to other fusion applications in which a new image may be received each cycle. In the FIR configuration mode, the pyramid storage circuit 430 and the noise processing stage 310 may operate based on various conditions to perform the partial fusions and accumulations in a specific order to achieve a desired result. The FIR application illustrated in FIGS. 11, 12A, and 12B may be performed by the image fusion circuit 400 in either processed image mode or raw image mode. For example, the pyramid generator referred to in FIGS. 12A and 12B may correspond to either the pyramid generator 332 or the raw pyramid generator 422, depending on which mode the image fusion circuit 400 is operating in.

As illustrated in FIG. 12A, at 1202, a pyramid generator receives frame 0 of a set of images, and generates a pyramid F0. At 1204, pyramid F0 is stored as a reference frame pyramid in raster format. Because the reference frame pyramid may need to be stored for an extended period of time and used to perform multiple fusions, the reference frame pyramid F0 may be stored in a persistent memory such as a DRAM, instead of in a cache.

At 1206, the pyramid generator receives frame 1 and generates a pyramid F1. At 1208, the pyramid F1 is stored in memory in tile format. In addition, an image registration processor may receive frame 1 and determine a set of warping parameters to align frame 1 with frame 0. At 1210, pyramids F0 and F1 are retrieved from memory and fused to generate a partial fusion pyramid P1 (e.g., the noise processing stage warps the pyramid F1 and fuses the warped pyramid with F0), which is stored in memory in raster format at 1212. As discussed above, the fusion may be performed with different weights for each frame (e.g., weight of ¼ for pyramid F0, and weight of ¾ for pyramid F1).

At 1214, the pyramid generator receives frame 2 and generates a pyramid F2. At 1216, the pyramid F2 is stored in memory in tile format. In addition, a set of warping parameters may be determined to align frame 2 with frame 0. At 1218, pyramids F0 and F2 are retrieved from memory and fused to generate a partial fusion pyramid P2 (e.g., the noise processing stage the pyramid F2 and fuses the warped pyramid with F0), which is stored in raster format at 1220. At 1222, the partial fusion pyramids P1 and P2 are retrieved from memory and fused. Because both pyramids F1 and F2 (corresponding to frame 1 and frame 2) were previously warped to align with reference frame 0 and pyramid F0, no additional warping needs to be performed when fusing P1 and P2. The partial fusion pyramids P1 and P2 are fused using fixed-parameter alpha-blending (e.g., using the weight parameters shown in FIG. 11). The resulting pyramid P4 is stored in memory in raster format at 1224.

At 1226, the pyramid generator receives frame 3 of the image set, and generates a corresponding pyramid F3. At 1228, the pyramid F3 is stored in memory in tile format. In addition, a set of warping parameters may be determined to align frame 3 with frame 0. At 1230, the noise processing stage retrieves pyramids F3 and F0, and fuses the pyramids to form partial fusion pyramid P3 (e.g., warping F3 based on the warping parameters and fusing the warped pyramid with F0), which is stored in memory at 1232. At 1234, the partial fusion results P3 and P4 are fused, e.g., using fixed-parameter alpha-blending. As pyramid F3 was already warped to align with reference pyramid F0 when producing partial fusion pyramid P3, no additional warping needs to be performed when fusing P3 and P4. The resulting fused pyramid may be output to spatial processing (e.g., to the noise reduction circuit 458) at 1236. The process may be repeated for subsequent sets of images.

On the other hand, in embodiments where the image fusion processor includes an additional fixed alpha-blending circuit (e.g., fixed alpha blending circuits 846 and 878), the image fusion circuit is able to perform a partial fusion and an accumulation (e.g., alpha-blend) in a single pass, increasing a speed at which FIR can be performed, and improving a rate at which image data for performing FIR can be received. In some embodiments, this may be referred to as "fast FIR."

Figure 12B:
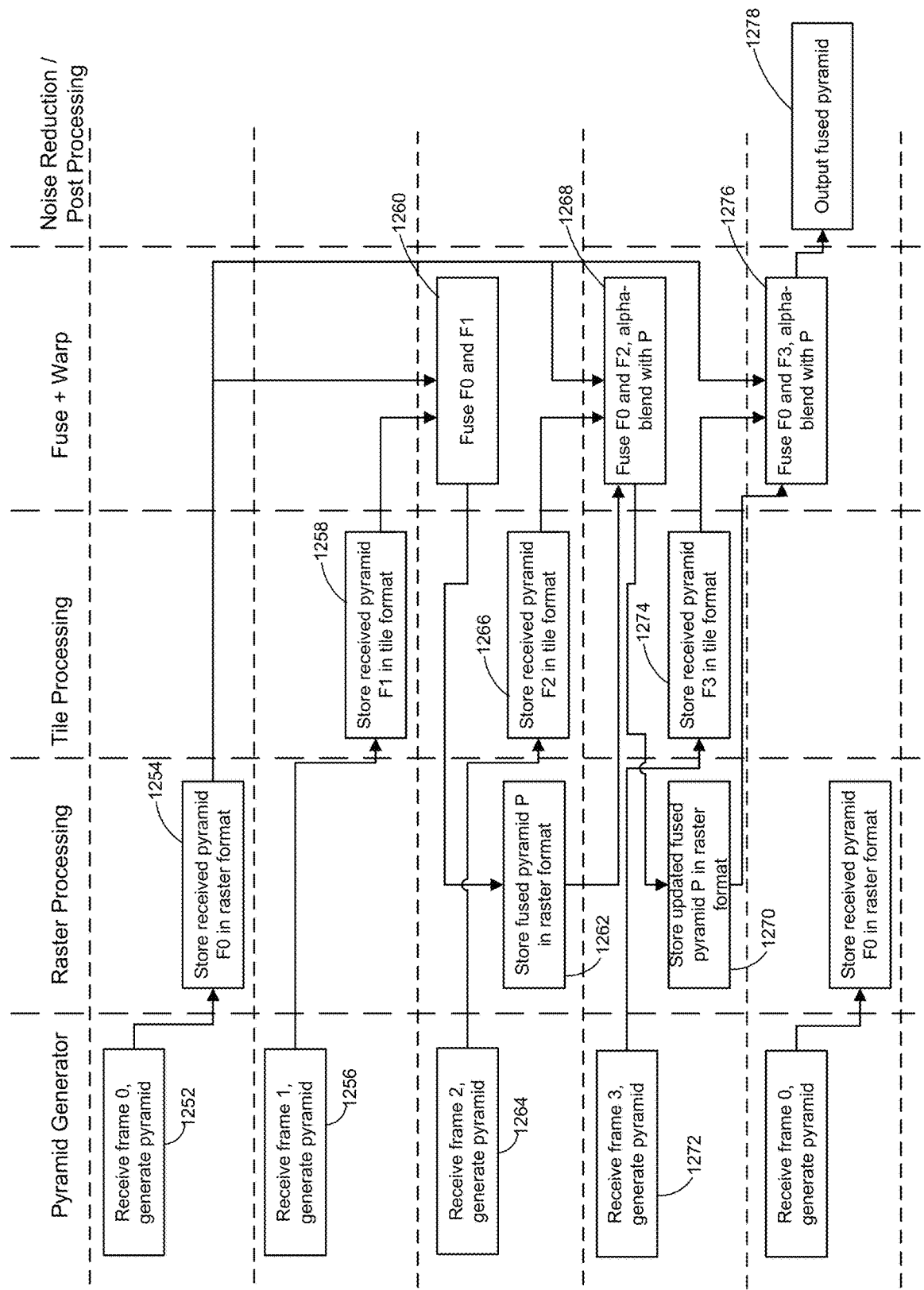
FIG. 12B illustrates a diagram describing a fast FIR temporal processing application that may be performed by the image fusion circuit, in accordance with some embodiments where the image fusion processor includes fixed alpha-blending circuits.

FIG. 12B illustrates a diagram describing a fast FIR temporal processing application that may be performed by the image fusion circuit 400, in accordance with some embodiments where the image fusion processor 450 includes fixed alpha-blending circuits 846/878. In the fast FIR application, a set of images (e.g., frames 0 to n) are fused in n−1 passes through the image fusion processor to generate n−1 partial fusion results, each corresponding to a fusion of a reference frame of the set (e.g., frame 0) to another image of the set. However, unlike the embodiment illustrated in FIG. 12A, the partial fusion results are accumulated as the they are generated to form the final fused image that is output for spatial processing. In the illustrated embodiment, a set of images contains four images (frames 0 to 3), resulting in the performance of three passes for partial fusion, two of which further comprise an accumulation/alpha-blending of two previously generated partial fusions. Due to a reduced number of passes through the image fusion processor 450 needed, the image fusion circuit 400 may receive images at a faster rate in comparison to the FIR application illustrated in FIG. 12A. In some embodiments, this may result in a nearly 50% reduction in a number passes through the image fusion processor 450 needed to be performed for each set of images when performing FIR (e.g., n−1 image fusion passes, compared to 2n−3 image fusion passes, i.e., (n−1)+(n−2)).

As illustrated in FIG. 12B, at 1252, the pyramid generator receives frame 0 of a set of images, and generates a pyramid F0. At 1254, pyramid F0 is stored as a reference frame pyramid in raster format. Because the reference frame pyramid may need to be stored for an extended period of time and used to perform multiple fusions, the reference frame pyramid F0 may be stored in a persistent memory such as a DRAM.

At 1256, the pyramid generator receives frame 1 and generates a pyramid F1. At 1258, the pyramid F1 is stored in memory in tile format. In addition, a set of warping parameters may be determined to align frame 1 with frame 0. At 1260, pyramids F0 and F1 are retrieved from memory and fused to generate a partial fusion pyramid P (e.g., by warping the pyramid F1 and fusing the warped pyramid with F0, where P corresponds to partial fusion P1 shown in FIG. 11), which is stored in memory in raster format at 1262. Because P is the only partial fusion pyramid generated so far, no accumulation with another partial fusion pyramid is performed during this pass.

At 1264, the pyramid generator receives frame 2 and generates a pyramid F2. At 1266, the pyramid F2 is stored in memory in tile format. At 1268, pyramids F0 and F2 are retrieved from memory and fused to generate a partial fusion pyramid (corresponding to partial fusion P2 in FIG. 11), which is then accumulated with the partial fusion pyramid P in the same pass through the image fusion circuit to generate an updated partial fusion pyramid P (e.g., corresponding to partial fusion P4 shown in FIG. 11), which is stored in memory in raster format at 1270. Because both pyramids F1 and F2 (corresponding to frame 1 and frame 2) were previously warped to align with reference frame 0 and pyramid F0, no additional warping needs to be performed when fusing the fusion of F0 and F2 with P, which can be done using fixed alpha-blending.

At 1272, the pyramid generator receives frame 3 of the image set, and generates a corresponding pyramid F3. At 1274, the pyramid F3 is stored in memory in tile format. At 1276, the fusion module 424 retrieves pyramids F3 and F0, and fuses the pyramids to form a partial fusion pyramid (e.g., corresponding to P3 in FIG. 11), which is then accumulated with the partial fusion pyramid P in the same pass through the image fusion circuit to generate an updated fused pyramid P (which now includes contributions from all four frames of the set). The resulting fused pyramid may be output to spatial processing (e.g., to the noise reduction circuit 458) at 1278. The process may be repeated for subsequent sets of images.

As such, by configuring the image fusion processor 450 to include additional fixed alpha-blending circuits, temporal processing applications that involve alpha-blending, such as FIR applications, can be performed in fewer clock cycles, due to the ability of the image fusion processor 450 to perform image fusion and accumulation in one pass through the circuit. Because partial fusions do not need to be stored back in memory and be retrieved again to be accumulated with other partial fusions, a number of passes through the image fusion circuit in FIR applications (for a set of n images) is reduced from 2n−3 (n−1 passes to generate n−1 partial fusions, and n−2 passes to accumulate the n−1 partial fusions), to n−1 passes. In addition, because the partial fusion P is updated as additional image frames are received, instead storing different generated partial fusions in memory for alpha-blending in later passes, only one partial fusion P is stored in memory during fast FIR at a time. As such, a memory footprint of the fast FIR application as shown in FIG. 12B is reduced in comparison to the traditional FIR application shown in FIG. 12A.

The image fusion circuit may be configured to perform the various temporal processing applications discussed above, such as two-frame fusion, temporal filtering, IIR, FIR, etc., based upon one or more configuration parameters received from a controller, which configure how image pyramids are received images are stored, which image pyramids are fused and in what order, etc. The control parameters specifying each temporal processing application the image fusion circuit is to perform may be independent from control parameters specifying the operating mode of the image fusion circuit (e.g., processed image mode or raw image mode), and as such can be performed using either operating mode. For example, while operating mode (e.g., processed or raw) determines what type of image pyramids are generated (e.g., using pyramid generator circuit 332 or raw pyramid generator 422), whether demosaicing and resampling occurs before pyramid generation or after noise reduction, and how components such as the image fusion processor 450 and noise reduction circuit 458 process received image data. On the other hand, the temporal processing application specifies the specific image fusion operations to be performed to generate a fused image to be processed by the noise reduction circuit. While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image fusion processor, comprising:
a first image fusion circuit configured to:
blend high frequency components of an unscaled layer of each of a first raw image pyramid and a second raw image pyramid to generate a fused high frequency component for the unscaled layer, and
aggregate the fused high frequency component for the unscaled layer with a fused image for a first downscaled layer to generate a fused raw image corresponding to an unscaled layer of a fused raw image pyramid; and
a second image fusion circuit coupled to the first image fusion circuit, the second image fusion circuit configured to:
generate the fused image for the first downscaled layer by blending high frequency components of the first downscaled layer of each of the first and second raw image pyramids to generate a high frequency component of the fused image, and
aggregate the generated high frequency component with a fused image corresponding to a subsequent downscaled layer of the first and second raw image pyramids.

2. The image fusion processor of claim 1, wherein the unscaled layer of the first raw image pyramid and the second raw image pyramid comprise Bayer image data.

3. The image fusion processor of claim 1, wherein the first downscaled layer of each of the first and second raw image pyramids comprises RGB image data.

4. The image fusion processor of claim 3, wherein the first downscaled layer of each of the first and second raw image pyramids is generated from the unscaled layer of each of the first and second raw image pyramids by applying a plurality of decimation kernels corresponding to different color channels to each pixel of the unscaled layer, and downscaling the unscaled layer along each dimension by a factor of 2.

5. The image fusion processor of claim 1, wherein the first image fusion circuit is configured to blend high frequency components of the unscaled layer of each of the first raw image pyramid and the second raw image pyramid based on a set of blending parameters, and wherein the set of blending parameters for a pixel of the unscaled layer is determined by:
determining a patch distance for the pixel by:
determining, for each of a plurality of different color channels of raw image data, a respective patch distance between pixels of respective patches of the high frequency components of the unscaled layer of each of the first and second raw image pyramids associated with the pixel;
aggregating the determined patch distances for each color channel to generate an aggregated patch distance; and
determining the set of blending parameters for the pixel based on the aggregated patch distance.

6. The image fusion processor of claim 1, wherein the second image fusion circuit is configured to:
receive image data corresponding to the first downscaled layer of the first and second raw image pyramids, wherein the image data is in an RGB color space;
convert the received image data from the RGB color space to a YCC color space; and
generate the fused image for the first downscaled layer in the YCC color space.

7. The image fusion processor of claim 1, wherein the fused raw image corresponding to the unscaled layer of the fused raw image pyramid comprises raw image data, and the fused image for the first downscaled layer comprises YCC image data.

8. The image fusion processor of claim 1, wherein the first image fusion circuit further comprises an alpha-blending circuit configured to perform fixed-parameter alpha-blending between the aggregation of the fused high frequency component for the unscaled layer and the fused image for the first downscaled layer with a fused raw image corresponding to an unscaled player of a third raw image pyramid to generate the fused raw image corresponding to the unscaled layer of the fused raw image pyramid.

9. The image fusion processor of claim 8, wherein the first image fusion circuit is further configured to route the aggregation of the fused high frequency component for the unscaled layer and the fused image for the first downscaled layer to the alpha-blending circuit, or bypass the alpha-blending circuit, based on a received control parameter.

10. A method for image fusion, comprising:
at a first image fusion circuit:
blending high frequency components of an unscaled layer of each of a first raw image pyramid and a second raw image pyramid to generate a fused high frequency component for the unscaled layer, and aggregating the fused high frequency component for the unscaled layer with a fused image for a first downscaled layer to generate a fused raw image corresponding to an unscaled layer of a fused raw image pyramid; and at a second image fusion circuit coupled to the first image fusion circuit:

generating the fused image for the first downscaled layer by blending high frequency components of the first downscaled layer of each of the first and second raw image pyramids to generate a high frequency component of the fused image, and aggregating the generated high frequency component with a fused image corresponding to a subsequent downscaled layer of the first and second raw image pyramids.

11. The method of claim 10, wherein the unscaled layer of the first raw image pyramid and the second raw image pyramid comprise Bayer image data.

12. The method of claim 10, wherein the first downscaled layer of each of the first and second raw image pyramids comprises RGB image data.

13. The method of claim 12, wherein the first downscaled layer of each of the first and second raw image pyramids is generated from the unscaled layer of each of the first and second raw image pyramids by applying a plurality of decimation kernels corresponding to different color channels to each pixel of the unsealed layer, and downscaling the unsealed layer along each dimension by a factor of 2.

14. The method of claim 10, further comprising:

for a pixel of the unsealed layer, determining a patch distance for the pixel by:

determining, for each of a plurality of different color channels of raw image data, a respective patch distance between pixels of respective patches of the high frequency components of the unsealed layer of each of the first and second raw image pyramids associated with the pixel; and aggregating the determined patch distances for each color channel to generate an aggregated patch distance; and determining blending parameters for the pixel based on the aggregated patch distance;

wherein the first image fusion circuit blends high frequency components of the unsealed layer of each of the first raw image pyramid and the second raw image pyramid based on the determined blending parameters.

15. The method of claim 10, further comprising, at the second image fusion circuit:

receiving image data corresponding to the first downscaled layer of the first and second raw image pyramids, wherein the image data is in an RGB color space;

converting the received image data from the RGB color space to a YCC color space; and generating the fused image for the first downscaled layer in the YCC color space.

16. The method of claim 10, wherein the fused raw image corresponding to the unscaled layer of the fused raw image pyramid comprises raw image data, and the fused image for the first downscaled layer comprises YCC image data.

17. The method of claim 10, further comprising performing fixed-parameter alpha-blending between the aggregation of the fused high frequency component for the unscaled layer and the fused image for the first downscaled layer with a fused raw image corresponding to an unscaled player of a third raw image pyramid to generate the fused raw image corresponding to the unscaled layer of the fused raw image pyramid.

18. An electronic device, comprising:

a memory;

an image signal processor comprising:

a first image fusion circuit configured to:

blend high frequency components of an unscaled layer of each of a first raw image pyramid and a second raw image pyramid to generate a fused high frequency component for the unscaled layer, and aggregate the fused high frequency component for the unscaled layer with a fused image for a first downscaled layer to generate a fused raw image corresponding to an unscaled layer of a fused raw image pyramid; and a second image fusion circuit coupled to the first image fusion circuit, the second image fusion circuit configured to:

generate the fused image for the first downscaled layer by blending high frequency components of the first downscaled layer of each of the first and second raw image pyramids to generate a high frequency component of the fused image, and aggregate the generated high frequency component with a fused image corresponding to a subsequent downscaled layer of the first and second raw image pyramids.

19. The electronic device of claim 18, wherein the unscaled layer of the first raw image pyramid and the second raw image pyramid comprise Bayer image data.

20. The electronic device of claim 18, wherein the first downscaled layer of each of the first and second raw image pyramids comprises RGB image data.

* * * * *

UNITED STATES PATENT AND TRADEMARK OFFICE
CERTIFICATE OF CORRECTION

| | |
|---|---|
| PATENT NO. | : 11,841,926 B2 |
| APPLICATION NO. | : 17/173074 |
| DATED | : December 12, 2023 |
| INVENTOR(S) | : Smirnov et al. |

It is certified that error appears in the above-identified patent and that said Letters Patent is hereby corrected as shown below:

In the Specification

In Column 4, Line 63, delete "(FIG." and insert -- (FIG.) --, therefor.

In Column 13, Line 3 1, delete "mage" and insert -- image --, therefor.

In Column 26, Line 53, delete "unsealed" and insert -- the unscaled --, therefor.

In Column 26, Line 54, delete "(unsealed" and insert -- (unscaled --, therefor.

In Column 26, Line 55, delete "unsealed" and insert -- unscaled --, therefor.

In Column 32, Line 66, delete "unsealed" and insert -- unscaled --, therefor.

In Column 33, Line 3, delete "unsealed" and insert -- unscaled --, therefor.

In Column 33, Line 5, delete "unsealed" and insert -- unscaled --, therefor.

In Column 33, Line 25, delete "unsealed" and insert -- unscaled --, therefor.

In Column 33, Line 29, delete "unsealed" and insert -- unscaled --, therefor.

In Column 35, Line 61, delete "%" and insert -- ¾ --, therefor.

In Column 37, Line 64, after "as" delete "the".

In Column 41, Claim 13, Line 28, delete "unsealed" and insert -- unscaled --, therefor.

In Column 41, Claim 13, Line 29, delete "unsealed" and insert -- unscaled --, therefor.

Signed and Sealed this
Twenty-third Day of January, 2024

*Katherine Kelly Vidal*

Katherine Kelly Vidal
*Director of the United States Patent and Trademark Office*

In Column 41, Claim 14, Line 31, delete "unsealed" and insert -- unscaled --, therefor.

In Column 41, Claim 14, Line 36, delete "unsealed" and insert -- unscaled --, therefor.

In Column 41, Claim 14, Line 45, delete "unsealed" and insert -- unscaled --, therefor.